US012444399B2

(12) United States Patent
Rule et al.

(10) Patent No.: US 12,444,399 B2
(45) Date of Patent: Oct. 14, 2025

(54) ACTIVE DAMPING OF RESONANT CANAL MODES

(71) Applicant: Bose Corporation, Framingham, MA (US)

(72) Inventors: John Allen Rule, Berlin, MA (US); David J. Warkentin, Framingham, MA (US)

(73) Assignee: Bose Corporation, Framingham, MA (US)

(*) Notice: Subject to any disclaimer, the term of this patent is extended or adjusted under 35 U.S.C. 154(b) by 281 days.

(21) Appl. No.: 17/902,018

(22) Filed: Sep. 2, 2022

(65) Prior Publication Data

US 2024/0078994 A1 Mar. 7, 2024

(51) Int. Cl.
*G10K 11/178* (2006.01)
*H04R 1/10* (2006.01)

(52) U.S. Cl.
CPC .. *G10K 11/17825* (2018.01); *G10K 11/17823* (2018.01); *G10K 11/17854* (2018.01); *G10K 11/17881* (2018.01); *H04R 1/1083* (2013.01); *G10K 2210/1081* (2013.01); *G10K 2210/3026* (2013.01); *G10K 2210/3027* (2013.01); *G10K 2210/3028* (2013.01); *H04R 2460/01* (2013.01)

(58) Field of Classification Search
CPC ....... G10K 11/17825; G10K 11/17823; G10K 11/17854; G10K 11/17881; G10K 2210/1081; G10K 2210/3026; G10K 2210/3027; G10K 2210/3028; G10K 11/17853; G10K 11/17817; H04R 1/1083; H04R 2460/01
USPC ........................................................ 381/71.5
See application file for complete search history.

(56) References Cited

U.S. PATENT DOCUMENTS 8,073,150 B2 12/2011 Joho et al.
8,073,151 B2 12/2011 Joho et al.
(Continued)

FOREIGN PATENT DOCUMENTS

CN 114422901 4/2022
EP 2793224 10/2014
(Continued)

OTHER PUBLICATIONS

International Preliminary Report on Patentability in International Appln. No. PCT/US2021/026332, mailed Oct. 25, 2022, 13 pages.
(Continued)

*Primary Examiner* — Carolyn R Edwards
*Assistant Examiner* — Friedrich Fahnert
(74) *Attorney, Agent, or Firm* — Fish & Richardson P.C.

(57) ABSTRACT

An active noise reduction (ANR) device includes an acoustic transducer, a first sensor, and a second sensor. The acoustic transducer is configured to generate output audio. The first sensor is configured to capture audio originating from an external environment of the ANR device. The second sensor is configured to generate a signal indicative of (1) the audio originating from the external environment and (2) the output audio generated by the acoustic transducer. The output audio generated by the acoustic transducer is modified based on a portion of the signal generated by the second sensor, the portion being attributable to a resonant mode of a user's ear canal.

28 Claims, 15 Drawing Sheets

(56) References Cited

U.S. PATENT DOCUMENTS

| | | | |
|---|---|---|---|
| 8,161,118 | B2 | 4/2012 | Maj et al. |
| 8,320,591 | B1 | 11/2012 | Wurtz |
| 8,718,290 | B2 | 5/2014 | Murgia et al. |
| 8,718,291 | B2 | 5/2014 | Alves et al. |
| 8,798,283 | B2 | 8/2014 | Gauger, Jr. et al. |
| 9,050,212 | B2 | 6/2015 | Gauger |
| 9,082,388 | B2 | 7/2015 | Anninziato et al. |
| 9,161,118 | B2 | 10/2015 | Howes et al. |
| 9,792,893 | B1 | 10/2017 | Gauger, Jr. et al. |
| 9,892,722 | B1 | 2/2018 | Bastyr et al. |
| 9,949,017 | B2 | 4/2018 | Rule et al. |
| 10,096,313 | B1 | 10/2018 | terMeulen et al. |
| 10,136,222 | B2 | 11/2018 | Hayashi et al. |
| 10,354,640 | B2 | 7/2019 | terMeulen et al. |
| 10,595,126 | B1 | 3/2020 | Chen et al. |
| 10,937,410 | B1 | 3/2021 | Rule |
| 11,062,687 | B2 | 7/2021 | Honda et al. |
| 11,600,256 | B2 | 3/2023 | Rule |
| 12,136,409 | B2 | 11/2024 | Rule |
| 2004/0264706 | A1 | 12/2004 | Ray et al. |
| 2005/0013447 | A1 | 1/2005 | Crump et al. |
| 2006/0069556 | A1 | 3/2006 | Nadjar et al. |
| 2009/0010447 | A1* | 1/2009 | Waite ............... G10K 11/17881 381/71.11 |
| 2010/0272275 | A1 | 10/2010 | Carreras et al. |
| 2010/0272283 | A1 | 10/2010 | Carreras et al. |
| 2011/0002474 | A1 | 1/2011 | Fuller |
| 2011/0222700 | A1 | 9/2011 | Bhandari |
| 2012/0170766 | A1 | 7/2012 | Alves et al. |
| 2013/0208908 | A1 | 8/2013 | Theiler et al. |
| 2013/0315412 | A1 | 11/2013 | Anninziato et al. |
| 2013/0329902 | A1 | 12/2013 | Bakalos |
| 2014/0126733 | A1 | 5/2014 | Gauger, Jr. et al. |
| 2014/0126735 | A1 | 5/2014 | Gauger, Jr. |
| 2014/0126736 | A1 | 5/2014 | Gauger, Jr. et al. |
| 2014/0126756 | A1 | 5/2014 | Gauger, Jr. |
| 2014/0363010 | A1 | 12/2014 | Christopher et al. |
| 2016/0267899 | A1 | 9/2016 | Gauger, Jr. et al. |
| 2017/0245045 | A1 | 8/2017 | Horbach |
| 2018/0206025 | A1 | 7/2018 | Rule et al. |
| 2018/0249266 | A1 | 8/2018 | Termeulen et al. |
| 2018/0286374 | A1* | 10/2018 | Cattell ............. G10K 11/17881 |
| 2018/0286375 | A1 | 10/2018 | Cattell et al. |
| 2019/0019491 | A1 | 1/2019 | Kumar et al. |
| 2019/0037324 | A1 | 1/2019 | Darlington et al. |
| 2019/0191238 | A1 | 6/2019 | Horbach |
| 2021/0335336 | A1 | 10/2021 | Rule |

FOREIGN PATENT DOCUMENTS

| | | |
|---|---|---|
| EP | 2999234 | 10/2019 |
| GB | 2487125 | 7/2012 |
| JP | 2020-510240 A | 4/2020 |
| WO | WO 2007011337 | 1/2007 |
| WO | WO 2018183714 | 10/2018 |

OTHER PUBLICATIONS

International Search Report and Written Opinion in International Search Report in International Appln. No. PCT/US2021/026332, mailed Aug. 24, 2021, 19 pages.

Invitation to Pay Additional Fees in International Appln. No. PCT/US2021/026332, mailed Jul. 1, 2021, 13 pages.

International Search Report and Written Opinion in International Appln. No. PCT/US2023/030682, mailed Nov. 28, 2023, 12 pages.

* cited by examiner

ACTIVE DAMPING OF RESONANT CANAL MODES

TECHNICAL FIELD

The description generally relates to active damping of audio attributable to a resonant mode of a user's ear canal.

BACKGROUND

Acoustic devices such as headphones can include active noise reduction (ANR) capabilities that prevent at least portions of ambient noise from reaching the eardrum of a user. The acoustic device may include one or more microphones, one or more output transducers, and a noise reduction circuit coupled to the one or more microphones and output transducers to provide anti-noise signals to the one or more output transducers based on the signals detected at the one or more microphones. The anti-noise signals cancel at least portions of the ambient noise to reduce the amount of ambient noise reaching an eardrum of the user.

SUMMARY

This document describes methods for damping audio attributable to a resonant mode of a user's ear canal and acoustic devices capable of implementing such methods. The ear canals of many humans have one or more strong acoustic resonant modes (e.g., between 2,000 Hz and 4,000 Hz). However, when using an acoustic device such as an in-ear headphones that are inserted into the user's ears, the frequencies of the resonant modes for a particular user can shift substantially (e.g., to between 3,000 Hz and 10,000 Hz). This shift in resonant frequencies can result in the user experiencing an unnatural listening experience when using the acoustic device compared to listening to audio without the acoustic device inserted into the user's ear. Therefore, it can be desirable to damp audio signals at these unnatural resonant frequencies. In some implementations, the audio signals can correspond to audio output by one or more output transducers of the audio device and/or audio originating from an environment external to the acoustic device.

Existing acoustic devices with active noise reduction (ANR) capabilities (sometimes referred to as "ANR devices") often use broadband control to cancel audio signals. For example, broadband ANR control can include capturing an audio signal with one or more microphones, using an adaptive filter to generate an anti-noise signal, and driving the output transducer based on the anti-noise signal to cancel the captured audio signal. ANR devices that use broadband control can simultaneously cancel audio at a wide range of frequencies, but such ANR solutions typically have an upper frequency limit of 1,000-2,000 Hz.

At higher frequencies (e.g., 3,000-10,000 Hz), the acoustic response is dominated by resonant modes. While this high frequency range has historically been out-of-band for ANR solutions, the technology described herein uses modal control to target this frequency range, actively damping the audio attributable to resonant modes of a user's ear canal.

Various implementations of the technology described herein may provide one or more of the following advantages.

As previously described, unlike existing ANR solutions, the technology described herein can dampen audio at high frequencies (e.g., 3,000-10,000 Hz), where the audio response can be dominated by resonant modes. This can improve the listening experience of a user by reducing noise and resulting in a more natural audio response (e.g., reducing audio peaks at unnatural resonant frequencies). In some cases, the technology described herein can also reduce head-to-head variability in the performance of ANR devices when used by individuals with differently shaped ear canals (and different resonant modes).

The technology described herein can also have the advantage of being implementable on hardware that already exists on many ANR devices (e.g., microphones, output transducers, controllers, etc.). Importantly, the technology described herein does not require the insertion of an additional microphone into a user's ear canal to measure an audio response within the user's ear canal. Rather, by using modal control and by capitalizing on the physics of resonant modes, the technology described herein is able to reduce the response at the user's ear canal simply by damping audio at a location of an output transducer (sometimes referred to herein as a "driver") of the ANR device.

In some implementations, the technology described herein can also provide the advantages of being extendable to multiple resonant modes and being combinable with existing ANR solutions (e.g., broadband control solutions) that can reduce an audio response at lower frequency regimes (e.g., frequencies below 1,000-2,000 Hz).

In one aspect, an active noise reduction (ANR) device includes an acoustic transducer, a first sensor, and a second sensor. The acoustic transducer is configured to generate output audio. The first sensor is configured to capture audio originating from an external environment of the ANR device. The second sensor is configured to generate a signal indicative of (1) the audio originating from the external environment and (2) the output audio generated by the acoustic transducer. The output audio generated by the acoustic transducer is modified based on a portion of the signal generated by the second sensor, the portion being attributable to a resonant mode of a user's ear canal.

Implementations can include the examples described below and herein elsewhere. In some implementations, the portion of the signal generated by the second sensor that is attributable to the resonant mode can include: a first sub-portion derived from the audio originating from the external environment of the ANR device, and a second sub-portion derived from the output audio generated by the acoustic transducer. In some implementations, the resonant mode can correspond to a resonant frequency between 3 kHz and 10 kHz. In some implementations, the output audio can be modified by rate feedback on the portion of the signal generated by the second sensor that is attributable to the resonant mode. In some implementations, the output audio can be modified by summing, with the output audio, a signal indicative of a velocity of the resonant mode. In some implementations, the signal indicative of the velocity of the resonant mode can represent a multiple of the velocity of the resonant mode. In some implementations, the signal indicative of the velocity of the resonant mode can represent a filtered version of the signal generated by the second sensor. In some implementations, the ANR device can be configured to be inserted, at least partially, in an ear of the user.

In some implementations, the output audio generated by the acoustic transducer can be modified to attenuate, at a resonant frequency corresponding to the resonant mode, the audio originating from the external environment of the ANR device that arrives at the user's ear canal. In some implementations, the output audio generated by the acoustic transducer can be modified to smooth, at a resonant frequency corresponding to the resonant mode, a transfer function representing the user's ear canal. In some implementations, the output audio generated by the acoustic transducer can be further modified based on a second portion of the signal generated by the second sensor, the second portion being attributable to a second resonant mode. In some implementations, the output audio generated by the acoustic transducer can be further modified using broadband noise reduction at a plurality of frequencies below 2 kHz. In some implementations, the portion being attributable to the resonant mode of a user's ear canal can be identified by accounting for an individualized ear canal response of the user. In some implementations, one or more resonant frequencies corresponding to the resonant mode can be identified using a phase-locked loop and/or using a peak detection algorithm. In some implementations, one or more resonant frequencies corresponding to the resonant mode can be tracked in real time.

In another aspect, a method is featured. The method includes capturing, at a first sensor of an active noise reduction (ANR) device, audio originating from an environment external to the ANR device; generating output audio at an acoustic transducer of the ANR device; and generating, at a second sensor of the ANR device, a signal indicative of: (1) the audio originating from the environment external to the ANR device, and (2) the output audio generated by the acoustic transducer. The method also includes identifying a portion of the signal generated by the second sensor that is attributable to a resonant mode of an ear canal of a user of the ANR device; and modifying the output audio generated by the acoustic transducer based on the identified portion of the signal generated by the second sensor.

Implementations can include the examples described below and herein elsewhere. In some implementations, identifying the portion of the signal generated by the second sensor can include: deriving, from the audio originating from the environment external to the ANR device, a first sub-portion that is attributable to the resonant mode of the ear canal of the user; deriving, from the output audio generated by the acoustic transducer, a second sub-portion that is attributable to the resonant mode of the ear canal of the user; and combining the first sub-portion and the second sub-portion. In some implementations, modifying the output audio generated by the acoustic transducer can include modifying the output audio at a frequency between 3 kHz and 10 kHz, the frequency corresponding to the resonant mode of the ear canal of the user. In some implementations, modifying the output audio generated by the acoustic transducer can include performing rate feedback on the portion of the signal generated by the second sensor that is attributable to the resonant mode. In some implementations, modifying the output audio generated by the acoustic transducer can include: generating a signal indicative of a velocity of the resonant mode, and summing, with the output audio, the signal indicative of the velocity of the resonant mode. In some implementations, generating the signal indicative of the velocity of the resonant mode can include multiplying the velocity of the resonant mode by a constant. In some implementations, generating the signal indicative of the velocity of the resonant mode can include filtering the portion of the signal generated by the second sensor. In some implementations, modifying the output audio generated by the acoustic transducer can include modifying the output audio to attenuate, at a resonant frequency corresponding to the resonant mode, the audio originating from the environment external to the ANR device that arrives at the user's ear canal. In some implementations, modifying the output audio generated by the acoustic transducer can include modifying the output audio to smooth, at a resonant frequency corresponding to the resonant mode, a transfer function representing the user's ear canal. In some implementations, the method can further include identifying a second portion of the signal generated by the second sensor that is attributable to a second resonant mode of the ear canal of the user, and modifying the output audio generated by the acoustic transducer based on the identified second portion of the signal generated by the second sensor. In some implementations, the method can further include modifying the output audio generated by the acoustic transducer using broadband noise reduction at a plurality of frequencies below 2 kHz. In some implementations, identifying the portion of the signal generated by the second sensor that is attributable to the resonant mode of the ear canal of the user can include accounting for an individualized ear canal response of the user. In some implementations, identifying the portion of the signal generated by the second sensor that is attributable to the resonant mode of the ear canal of the user of the ANR device can include identifying one or more resonant frequencies corresponding to the resonant mode using a phase-locked loop and/or using a peak detection algorithm. In some implementations, identifying the portion of the signal generated by the second sensor that is attributable to the resonant mode of the ear canal of the user of the ANR device can also include tracking the one or more resonant frequencies in real time.

In another aspect, one or more machine-readable storage devices are featured. The one or more machine-readable storage devices have encoded thereon computer readable instructions for causing one or more processing devices to perform operations. The operations include capturing, at a first sensor of an active noise reduction (ANR) device, audio originating from an environment external to the ANR device; generating output audio at an acoustic transducer of the ANR device; and generating, at a second sensor of the ANR device, a signal indicative of: (1) the audio originating from the environment external to the ANR device, and (2) the output audio generated by the acoustic transducer. The operations also include identifying a portion of the signal generated by the second sensor that is attributable to a resonant mode of an ear canal of a user of the ANR device, and modifying the output audio generated by the acoustic transducer based on the identified portion of the signal generated by the second sensor.

Implementations can include the examples described below and herein elsewhere. In some implementations, identifying the portion of the signal generated by the second sensor can include: deriving, from the audio originating from the environment external to the ANR device, a first sub-portion that is attributable to the resonant mode of the ear canal of the user; deriving, from the output audio generated by the acoustic transducer, a second sub-portion that is attributable to the resonant mode of the ear canal of the user; and combining the first sub-portion and the second sub-portion. In some implementations, modifying the output audio generated by the acoustic transducer can include modifying the output audio at a frequency between 3 kHz and 10 kHz, the frequency corresponding to the resonant mode of the ear canal of the user. In some implementations, modifying the output audio generated by the acoustic transducer can include performing rate feedback on the portion of the signal generated by the second sensor that is attributable to the resonant mode. In some implementations, modifying the output audio generated by the acoustic transducer can include: generating a signal indicative of a velocity of the resonant mode, and summing, with the output audio, the signal indicative of the velocity of the resonant mode. In some implementations, generating the signal indicative of the velocity of the resonant mode can include multiplying the velocity of the resonant mode by a constant. In some implementations, generating the signal indicative of the velocity of the resonant mode can include filtering the portion of the signal generated by the second sensor. In some implementations, modifying the output audio generated by the acoustic transducer can include modifying the output audio to attenuate, at a resonant frequency corresponding to the resonant mode, the audio originating from the environment external to the ANR device that arrives at the user's ear canal. In some implementations, modifying the output audio generated by the acoustic transducer can include modifying the output audio to smooth, at a resonant frequency corresponding to the resonant mode, a transfer function representing the user's ear canal. In some implementations, the operations can further include identifying a second portion of the signal generated by the second sensor that is attributable to a second resonant mode of the ear canal of the user, and modifying the output audio generated by the acoustic transducer based on the identified second portion of the signal generated by the second sensor. In some implementations, the operations can further include modifying the output audio generated by the acoustic transducer using broadband noise reduction at a plurality of frequencies below 2 kHz. In some implementations, identifying the portion of the signal generated by the second sensor that is attributable to the resonant mode of the ear canal of the user can include accounting for an individualized ear canal response of the user. In some implementations, identifying the portion of the signal generated by the second sensor that is attributable to the resonant mode of the ear canal of the user of the ANR device can include identifying one or more resonant frequencies corresponding to the resonant mode using a phase-locked loop and/or using a peak detection algorithm. In some implementations, identifying the portion of the signal generated by the second sensor that is attributable to the resonant mode of the ear canal of the user of the ANR device can also include tracking the one or more resonant frequencies in real time.

Other features and advantages of the description will become apparent from the following description, and from the claims. Unless otherwise defined, the technical and scientific terms used herein have the same meaning as commonly understood by one of ordinary skill in the art to which this invention belongs.

DETAILED DESCRIPTION

In this document we describe technology that can improve the performance of acoustic devices such as active noise reduction (ANR) devices. Active noise reduction devices such as active noise reduction headphones are used for providing potentially immersive listening experiences by reducing effects of ambient noise and sounds. In some implementations, the active noise reduction device may include a feedforward microphone, a feedback microphone, an output transducer, and a noise reduction circuit coupled to the microphones and the output transducer to provide anti-noise signals to the output transducer based on the signals detected at the microphones.

Figure 1:
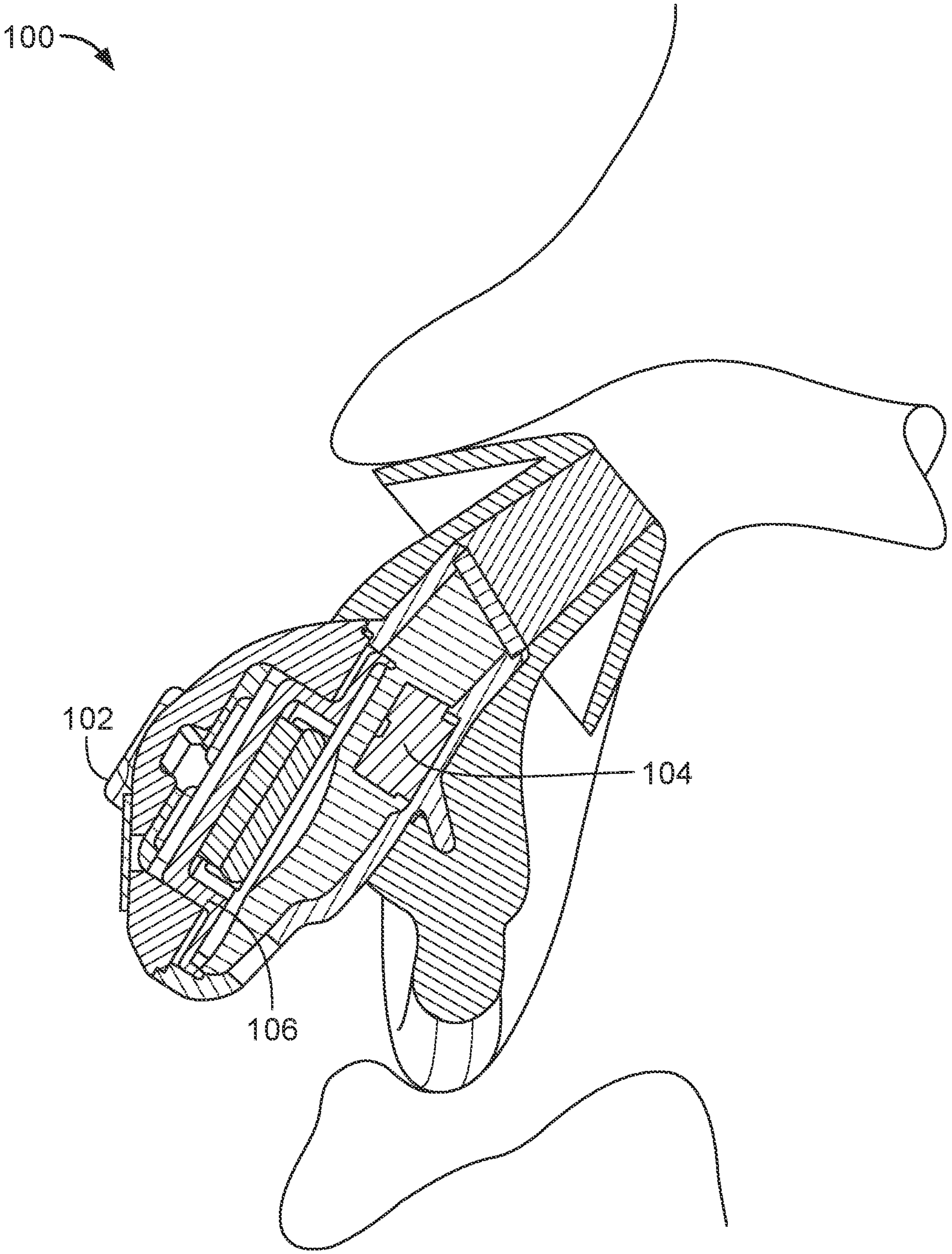
FIG. 1 shows an example of an in-the-ear active noise reduction headphone.

Referring to FIG. 1, an acoustic implementation of an in-ear active noise reduction headphone 100 includes a feedforward microphone 102, a feedback microphone 104, an output transducer 106 (which may also be referred to as an electroacoustic transducer or acoustic transducer or driver or speaker), and a noise reduction circuit (not shown) coupled to both microphones 102, 104 and the output transducer 106 to provide anti-noise signals to the output transducer 106 based on the signals detected at both microphones 102, 104. An additional input (not shown in FIG. 1) to the circuit provides additional audio signals, such as music or communication signals, for playback over the output transducer 106 independently of the noise reduction signals. Additional information regarding the in-ear active noise reduction headphone 100 can be found in, e.g., U.S. Pat. No. 9,082,388, incorporated herein by reference in its entirety.

In some implementations, the feedforward microphone 102 can be disposed on an outward-facing surface of the in-ear active noise reduction headphone 100 and can capture audio from an environment external to the in-ear active noise reduction headphone 100. Accordingly, the feedforward microphone 102 can sometimes be referred to as an "outside microphone."

In some implementations, the feedback microphone 104 can be positioned closer to an ear canal of the user than the feedforward microphone 102. The feedback microphone 104 can be configured to capture audio originating from the external environment as well as audio output by the output transducer 106. In some cases, the feedback microphone 104 can sometimes be referred to as a "system microphone."

The noise reduction circuit can include a configurable digital signal processor (DSP) that can implement various signal flow topologies and filter configurations. Examples of such digital signal processors are described in U.S. Pat. Nos. 8,073,150 and 8,073,151, which are incorporated herein by reference in their entirety.

The term headphone, which is interchangeably used herein with the term headset, includes various types of personal acoustic devices such as in-ear, around-ear, over-the-ear, or open-ear headsets, earphones, and hearing aids. The headsets or headphones can include an earbud or ear cup for each ear. The earbuds or ear cups may be physically tethered to each other, for example, by a cord, an over-the-head bridge or headband, or a behind-the-head retaining structure. In some implementations, the earbuds or ear cups of a headphone may be connected to one another via a wireless link.

The active noise reduction headphone 100 offers a feature commonly called "talk-through" or "monitor," in which the outside microphone 102 is used to detect external sounds that the user may want to hear. In some implementations, the outside microphone 102, upon detecting sounds in the voice-band or some other frequency band of interest, can allow signals in the corresponding frequency bands to be piped through the active noise reduction headphone 100. In some implementations, the active noise reduction headphone 100 allows multi-mode operations, in which in a "hear-through" mode, the active noise reduction functionality may be switched off or at least reduced, over at least a range of frequencies, to allow relatively wide-band ambient sounds to reach the user. In some implementations, the active noise reduction headphone 100 allows the user to control the amount of noise and ambient sounds that pass through the active noise reduction headphone 100.

In some implementations, an active noise reduction signal flow path is provided in parallel with a pass-through signal flow path, in which the gain of the pass-through signal path is controllable by the user. This may allow for implementing active noise reduction devices where the amount of ambient noise passed through can be adjusted based on user-input (e.g., either in discrete steps, or substantially continuously) without having to turn-off or reduce the active noise reduction provided by the device. In some examples, this may improve the overall user experience, for example, by avoiding any audible artifacts associated with switching between active noise reduction and pass-through modes, and/or putting the user in control of the amount of ambient noise that the user wishes to hear. This in turn can make active noise reduction devices more usable in various different applications and environments, particularly in those where a substantially continuous balance between active noise reduction and pass-through functionalities is desirable.

Various signal flow topologies can be implemented in an active noise reduction device to enable functionalities such as audio equalization, feedback noise cancellation, feedforward noise cancellation, etc. Example signal flow topologies are described in U.S. Pat. No. 11,062,687, which is incorporated herein by reference in its entirety. The technology described herein can add to these functionalities by enabling modal control of audio responses at one or more resonant frequencies between 3,000 Hz and 10,000 Hz.

Figure 2:
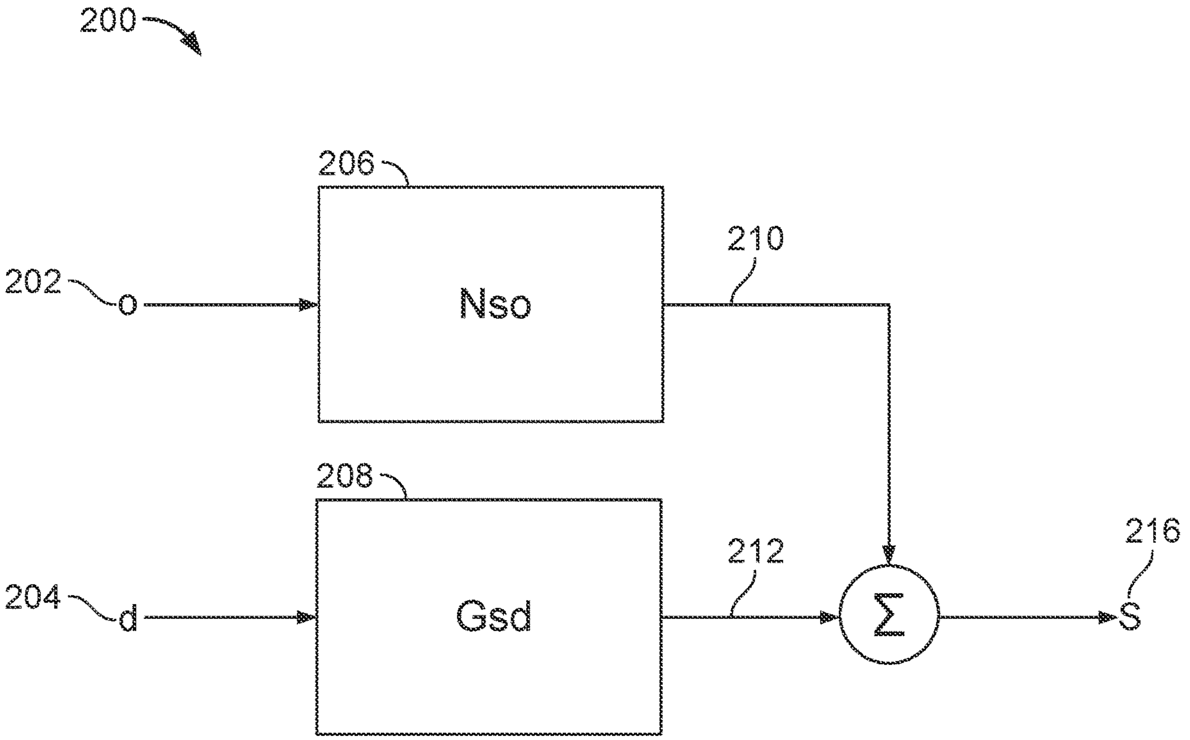
FIG. 2 is a block diagram of a first example configuration of an acoustic device.

FIG. 2 shows a block diagram of an example configuration 200 of an acoustic device (e.g., the ANR headphone 100), or a portion thereof. In the configuration 200, a first audio signal 202 (signal "o") is received by an outside microphone (e.g., the outside microphone 102) and can include audio originating from an environment external to the acoustic device. For example, the audio can include noise from the environment or human voices that a user may not wish to hear. A transfer function 206 (transfer function "Nso") represents how the audio 202 changes as it travels from a location of the outside microphone to a system microphone of the device (e.g., system microphone 104). The signal 210, therefore, represents the changed audio originating from the external environment, as received at a location of the system microphone.

In the configuration 200, a command signal 204 (signal "d") is input to a driver or speaker of the device (e.g., the output transducer 106) to drive the driver or speaker to produce a second audio signal. A transfer function 208 (transfer function "Gsd") represents how the audio outputted in accordance with the command signal "d" 204 changes as it travels from a location of the driver to the system microphone of the device. The signal 212, therefore, represents the changed outputted audio, as received at the location of the system microphone.

In some implementations, the "Gsd" transfer function 208 can be influenced by a range of characteristics including driver design, microphone response, port design, ear canal geometry, and fit quality. Consequently, the "Gsd" transfer function 208 can vary between different devices, between different users, between different use cases by a single user, or even between different moments in time during the same use case by a single user. In some implementations, therefore, it may be beneficial to measure the "Gsd" transfer function 208 in situ and/or in real time to account for these variations. Example methods of measuring the "Gsd" transfer function 208 and its decomposed sub-components (including variations to them) are described in U.S. Pat. No. 10,937,410, which is incorporated herein by reference in its entirety.

From the measured "Gsd" transfer function 208 or from a time-domain audio signal, one or more resonant frequencies can be identified and/or temporally tracked (e.g., in real time) using various techniques. For example, in some implementations, one or more phase-locked loops (PLLs) can be used to identify, extract, and/or track changes to resonant frequencies (e.g., corresponding to resonant noise) in an audio signal. In some implementations, tracking changes in the resonant frequencies can include estimating a value representative of a derivative of the acoustic response (e.g., with respect to frequency) at a particular suspected resonant frequency. For example, this can be done by measuring the frequency response at frequencies slightly below and slightly above the particular frequency. If the derivative is zero, or substantially close to zero, then the resonant frequency can be considered to be properly identified. However, if the derivative is substantially far from zero, the sign and magnitude of the derivative can be used to update the estimate of the suspected resonant frequency (e.g., in accordance with a quadratic cost function). This process can be repeated until the resonant frequency is satisfactorily identified. In some implementations, other peak identification algorithms for identifying and tracking resonant frequency peaks in the frequency domain can be implemented. Once the one or more resonant frequencies have been identified and/or tracked, active damping or cancellation of audio at these resonant frequencies can be implemented using techniques such as those described in further detail herein.

The system microphone captures an audio signal 216 (signal "s"), which is a combination of the signal 210 and the signal 212. The captured audio signal "s" 216 can therefore include audio originating from an external environment of the acoustic device as well as audio output by a driver of the acoustic device.

Figure 3:
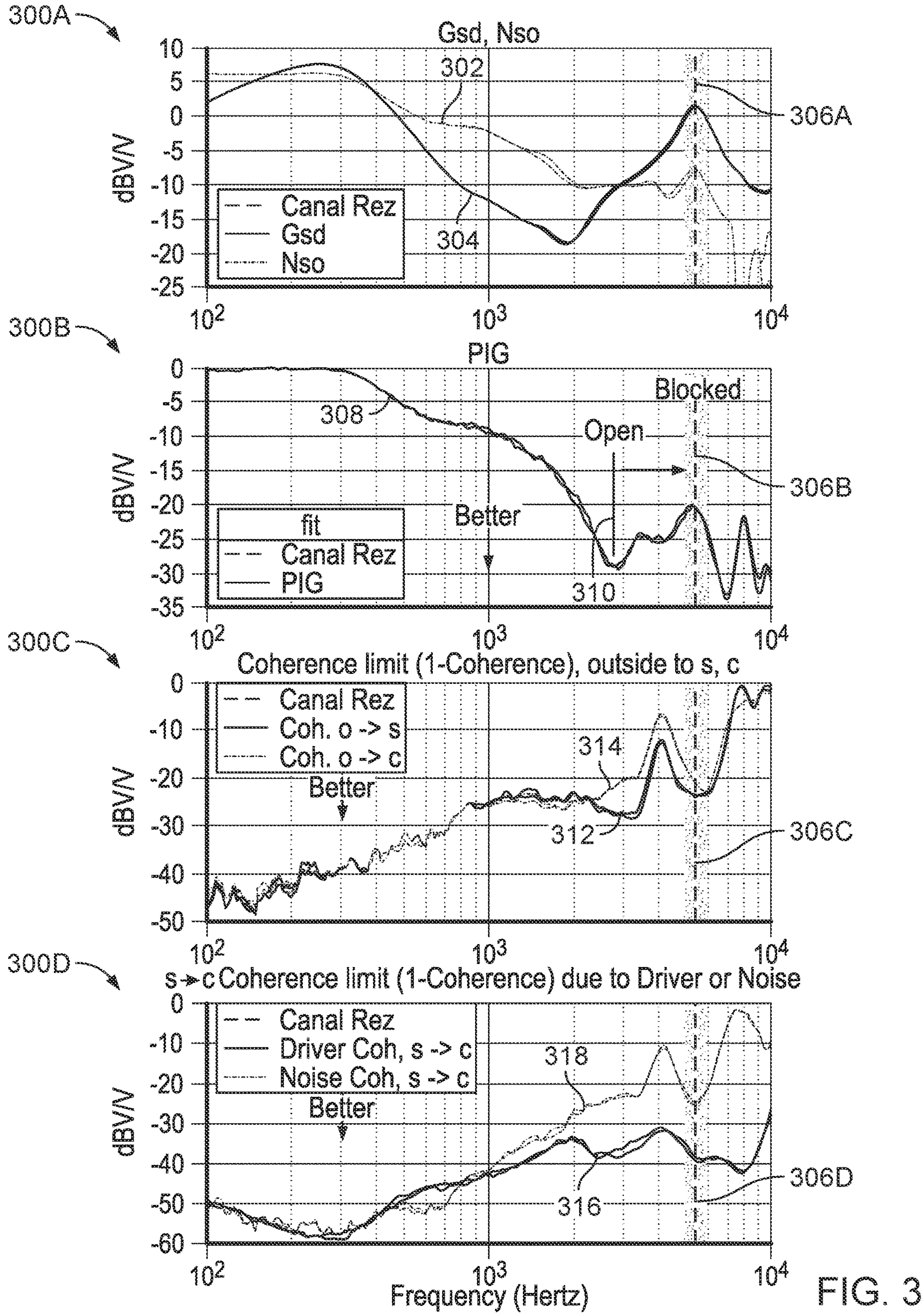
FIG. 3 shows graphs of experimental data corresponding to an acoustic device having the example configuration shown in FIG. 2.

FIG. 3 shows graphs 300A-300D, which include experimental data corresponding to an acoustic device having the configuration 200 shown in FIG. 2. Graph 300A plots audio response data corresponding to the "Nso" transfer function 206 and the "Gsd" transfer function 208. The traces 302 correspond to the "Nso" transfer function while the traces 304 correspond to the "Gsd" transfer function 208. The traces 302, 304 all have peaks at a frequency between 4,000 Hz and 5,000 Hz (denoted by dotted line 306A). These peaks are caused by resonant behavior at this frequency and correspond to a resonant mode of an ear canal of a user of the acoustic device.

Graph 300B plots data representing a passive insertion gain "PIG" of the acoustic device at various frequencies. Passive insertion gain is defined as the purely passive response of the ANR device when it is worn by the user, with lower values being more desirable for noise reduction applications. In graph 300B, the traces 308 represent the PIG and are also observed to peak at the resonant frequency (denoted in graph 300B by the dotted line 306B). One important observation is that the resonant frequency 306B of the user's ear canal when the in-ear ANR device is inserted (referred to as a "blocked" condition) is different from a resonant frequency 310 of the same user's ear canal when the in-ear ANR device is not inserted (referred to as an "open" condition). As previously described, this shift in the resonant frequency of the user's ear canal when using the ANR device can result in an unnatural listening experience for the user. Thus, it can be desirable to reduce the peaks in Gsd, Nso, and PIG that occur at the resonant frequency of the "blocked" condition.

In general, audio signals may be cancellable at one location if the signals received at that location are coherent with audio signals captured (e.g., by a microphone) at another location. Graphs 300C and 300D plot coherence data collected from experiments that were conducted to determine if resonant responses could be canceled. In these experiments, an in-ear ANR device (similar to the ANR device 100 shown in FIG. 1) was inserted into the ear of an artificial head, which included a microphone (a "canal microphone") positioned within the ear canal to capture an audio signal "c." Although, in real-world applications, it may be undesirable or infeasible to insert a microphone into the ear canal of a user, for these experiments, the canal microphone was placed inside the artificial head to determine what audio might arrive at the ear canal of a real user.

Graph 300C shows the coherence limit (defined as one minus the coherence) of the signal "o" 202 captured by the outside microphone of the ANR device with (i) the signal "s" 216 captured by the system microphone and (ii) the signal "c" captured by the canal microphone. The traces 312 are indicative of the coherence between the signal "o" 202 and the signal "s" 216. Meanwhile, the traces 314 are indicative of the coherence between the signal "o" 202 and the signal "c". In both cases, higher coherence is indicated by lower values of the coherence limit along the y-axis, which can be desirable for noise reduction applications. The traces 312, 314 all have valleys at the resonant frequency (denoted by dotted line 306C), suggesting that at least a portion of these audio signals might be able to be cancelled.

Graph 300D shows the coherence limit of the signal "c" captured by the canal microphone with (i) a driver-related portion of the signal "s" (e.g., signal 212) and (ii) an external noise-related portion of the signal "s" (e.g., signal 210). The traces 316 are indicative of the coherence between the driver-related portion of the signal "s" and the signal "c". Meanwhile, the traces 318 are indicative of the coherence between the external noise-related portion of the signal "s" and the signal "c". Once again, higher coherence is indicated by lower values of the coherence limit along the y-axis, which can be desirable for noise reduction applications. Here, the traces 316, 318 also have valleys at the resonant frequency (denoted by dotted line 306D), suggesting that at least a portion of these audio signals might be able to be cancelled.

To cancel the audio attributable to the resonant mode of the user's ear canal, the technology described herein implements modal control. Traditional systems for active noise reduction often use broadband control rather than modal control, measuring frequency responses at a wide range of frequencies. However, such measurements do not convey internal details about an underlying physical model, such as an ear canal having one or more resonant frequencies. In contrast, modal control can be implemented based on an underlying model of the internal states of a plant (e.g., external noise and output audio generated by an in-ear ANR device arriving at an ear canal of a user).

Figure 4:
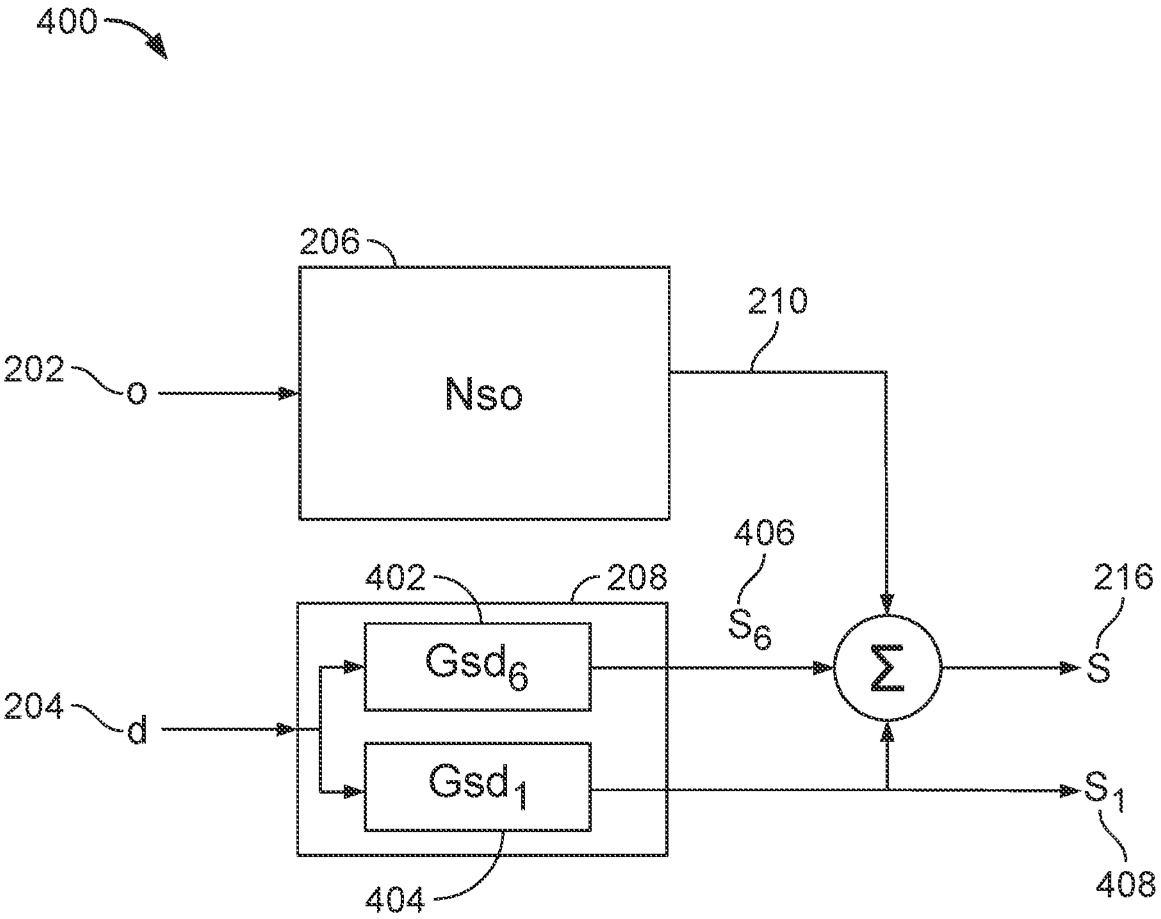
FIG. 4 is a block diagram of a second example configuration of an acoustic device.

FIG. 4 shows a block diagram of an example configuration 400 of an acoustic device (or a portion thereof) wherein the Gsd transfer function 208 is broken out into two parallel plant models 402, 404. The configuration 400 shares many similarities to the configuration 200, and accordingly, similar elements are indicated with similar reference numerals. Unlike the configuration 200, in the configuration 400, the Gsd transfer function 208 is decomposed into a first filter 402 ("$Gsd_6$") corresponding to a broadband response and a second filter 404 ("$Gsd_1$") corresponding to a first modal response (e.g., a resonance response). In some implementations, the $Gsd_6$ plant 402 can be modeled using six bi-quad filters while the $Gsd_1$ plant 404 can be modeled using a single bi-quad filter. The $Gsd_6$ plant 402 receives an audio signal corresponding to the command signal "d" 204, and outputs a broadband portion of the audio signal as captured at the system microphone (signal "$s_6$" 406). The $Gsd_1$ plant 404, on the other hand, receives the audio signal corresponding to the command signal "d" 204 and outputs a resonant mode portion (e.g., a portion of the audio attributable to a resonant mode) as captured at the system microphone (signal "$s_1$" 408). In some implementations, the combination of the signal $s_1$ 408 and the signal $s_6$ 406 can be substantially similar to the signal 212 shown in FIG. 2. The signal 210, the signal $s_6$ 406, and the signal $s_1$ 408 can all be combined (e.g., summed) to compute the signal "s" 216. Compared to the configuration 200 shown in FIG. 2, the configuration 400 can have the advantage of separating out signal "$s_1$" 408, which can enable the independent damping of the resonant mode (e.g., by operating independently on a resonant portion of audio originating from the driver).

As described above, in some implementations, the Gsd transfer function 208 can be measured in situ and/or in real time (e.g., during a single use of the acoustic device) to account for differences between users and/or differences in the fit of an ANR device in a user's ear. Applying such measurement of the Gsd transfer function 208 to the configuration 400, it can be possible to identify one or more high frequency resonant peaks corresponding to a particular individual's ear canal response, which can vary between users and/or between use cases of an ANR device (e.g., between a loose fit or a snug fit of the ANR device). This identification of individualized high frequency resonant peaks can yield the advantage of providing customized and personalized estimates of the $Gsd_1$ plant 404 and the $Gsd_6$ plant 402, resulting in more personalized noise reduction.

Figure 5:
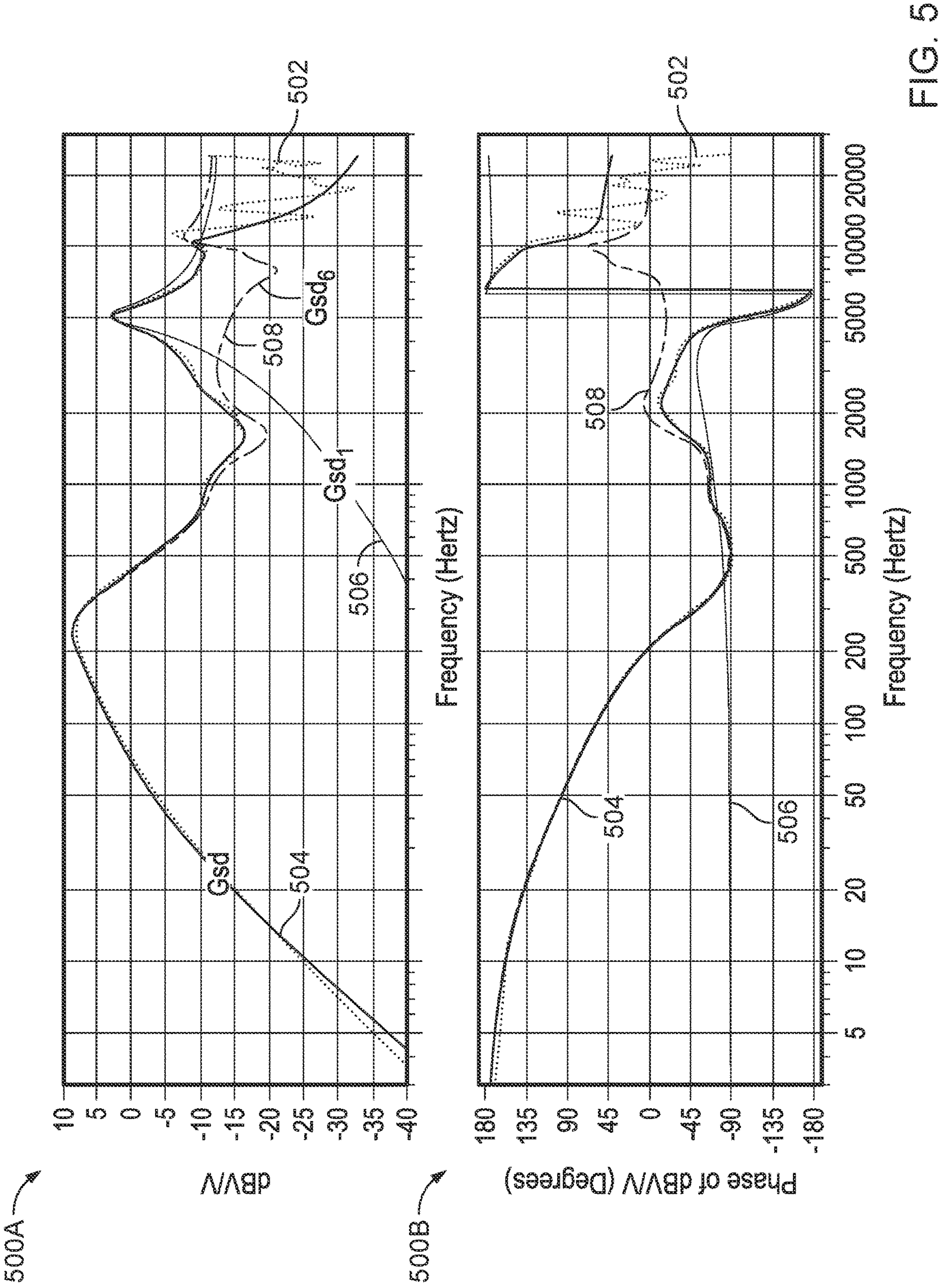
FIG. 5 shows graphs of experimental data corresponding to an acoustic device having the example configuration shown in FIG. 4.

FIG. 5 shows graphs 500A, 500B, which include experimental acoustic response data (plotted points 502) corresponding to an acoustic device having the configuration 400 shown in FIG. 4. Graph 500A plots the magnitude of the acoustic response of the Gsd transfer function 208 at various frequencies while graph 500B plots the phase of the acoustic response. The traces 504 fitted to plotted points 502 therefore represent an estimate of the overall Gsd transfer function 208. Meanwhile the traces 506 represent an estimate of the $Gsd_1$ filter 404, and the traces 508 represent an estimate of the $Gsd_6$ filter 402. As expected, the estimated response of the $Gsd_1$ filter 404 has a single peak at the resonant frequency (e.g., around 5,000 Hz) since it is the response of just the resonance. In addition, the estimated responses of the $Gsd_1$ filter 404 (the resonant mode response) and the $Gsd_6$ filter 402 (the broadband response) sum up to the overall response of the Gsd transfer function 208, as expected based on the configuration 400.

Figure 6:
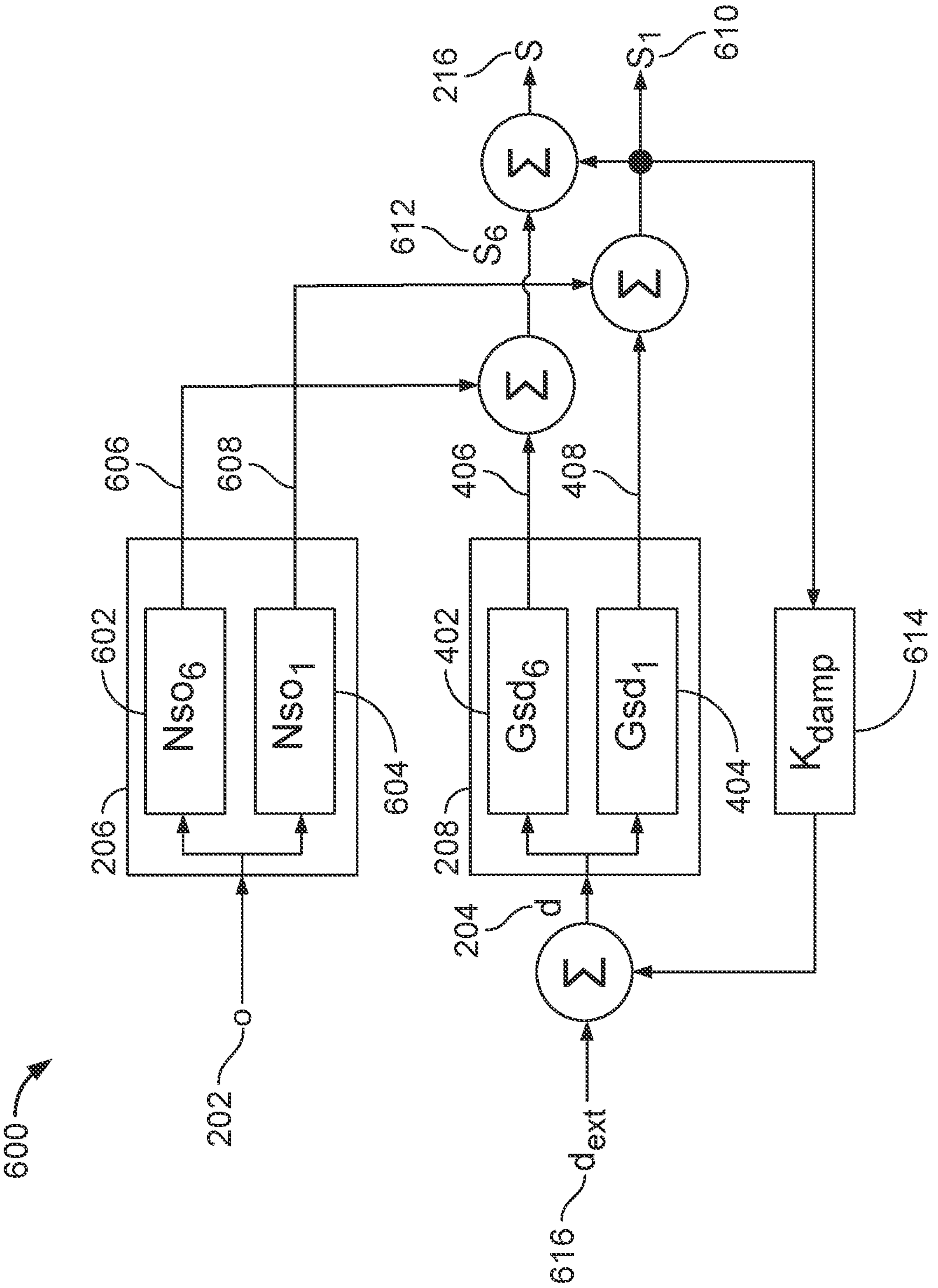
FIG. 6 is a block diagram of a third example configuration of an acoustic device.

Referring now to FIG. 6, a block diagram of another example configuration 600 of an acoustic device (or a portion thereof) is shown. The configuration 600 shares many similarities to the configuration 400, and accordingly, similar elements are indicated with similar reference numerals. In this configuration, however, the Nso transfer function 206 is also broken out into two parallel plant models 602, 604. Similar to the Gsd transfer function, the Nso transfer function 206 is split into a first filter 602 ("$Nso_6$") corresponding to a broadband response and a second filter 604 ("$Nso_1$") corresponding to a first modal response (e.g., a resonant modal response). In some implementations, the $Nso_6$ plant 602 can be modeled using six bi-quad filters while the $Nso_1$ plant 604 can be modeled using a single bi-quad filter. The $Nso_6$ plant 602 receives the signal "o" 202, and outputs a broadband portion of the signal "o" as captured at the system microphone (signal 606). The $Nso_1$ plant 604, on the other hand, receives the signal "o" 202 and outputs a resonant mode portion (e.g., a portion of the audio attributable to a resonant mode) as captured at the system microphone (signal 608). In some implementations, the combination of the signal 608 and the signal 606 can be substantially similar to the signal 210 shown in FIG. 2 and FIG. 4.

Another difference of the configuration 600 compared to the configuration 400 is that the signal "$s_6$" (the audio attributable to the broadband response) and the signal "$s_1$" (the audio attributable to the resonant response) now contains contributions from both the driver output (e.g., an audio output corresponding to the driver command signal "d" 204) and the external noise (e.g., the signal "o" 202) since both transfer functions 206, 208 are split into parallel plants. In configuration 600, the signal "$s_6$" 612 includes a combination (e.g., a sum) of the broadband signal 606 originating in the external environment and the broadband signal 406 originating at the driver. Meanwhile, the signal "$s_1$" 610 includes a combination (e.g., a sum) of the resonance signal 608 originating in the external environment and the resonance signal 408 originating at the driver. A combination (e.g., a sum) of the signal "$S_1$" 610 and the signal "$s_6$" can yield the full signal "s" 216 captured at the system microphone.

In configuration 600, separating out signal "$s_1$" 610 (the audio attributable to the resonant response) can enable the independent damping of the resonant mode. To this effect, provided that the signal "$s_1$" can be estimated, the configuration 600 can include a damping feedback loop with damping filter 614 that acts on the signal "$s_1$" 610 to actively damp audio that is attributable to the resonant mode. The damping loop can perform rate feedback on the signal "$s_1$" 610, effectively resisting a velocity of the resonant mode. For example, in some implementations, the damping filter 614 can be a single bi-quad low pass filter that multiplies the velocity of the resonant mode by a constant factor. The resulting signal can then be combined (e.g., summed) with other components such as an external signal "$d_{ext}$" 616 to generate the driver command signal "d" 204, which is fed back to the driver to adjust the driver's audio output.

Figure 7:
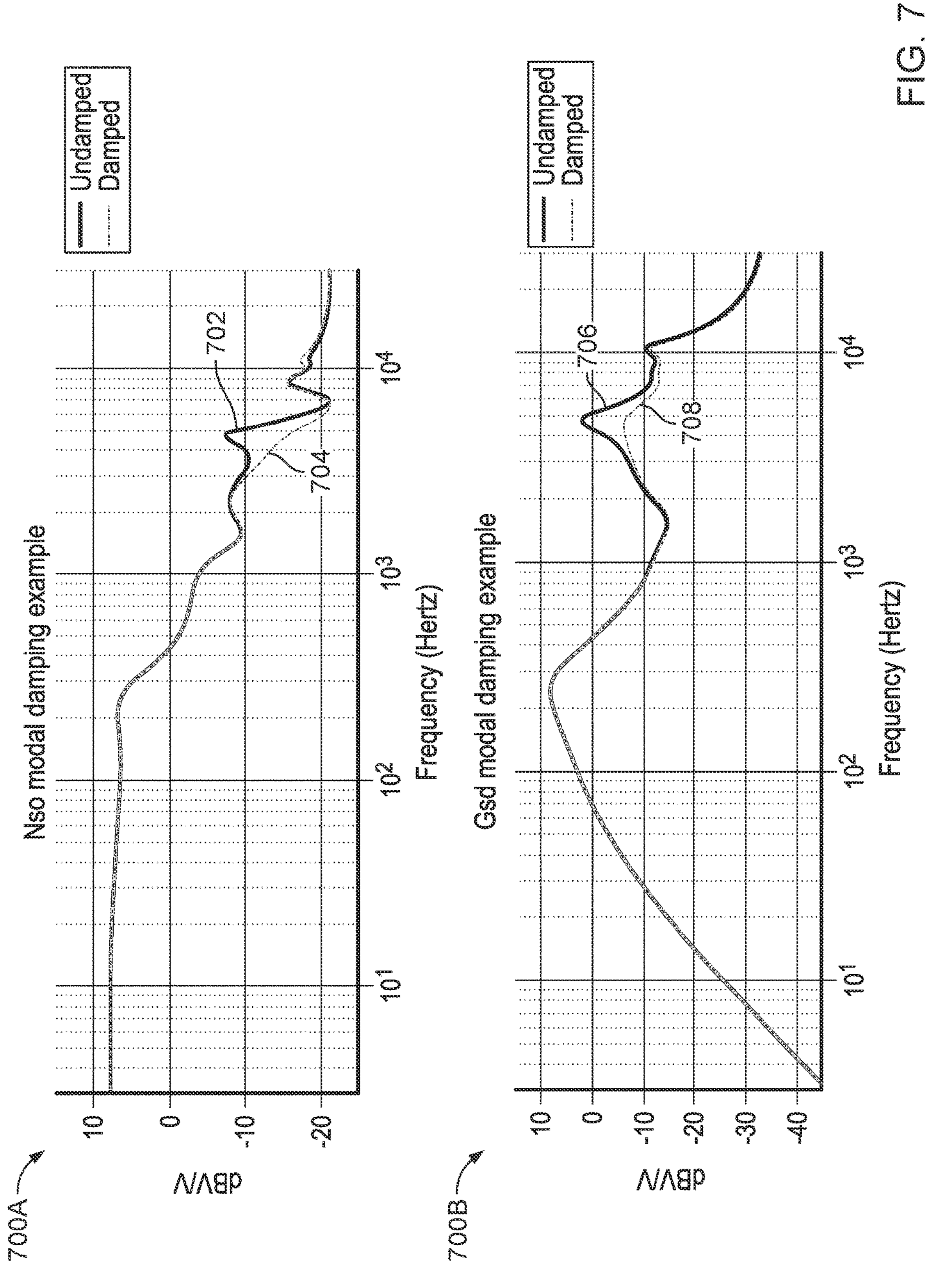
FIG. 7 shows graphs of simulated data corresponding to an acoustic device having the example configuration shown in FIG. 6.

FIG. 7 shows graphs 700A, 700B, which include simulated data corresponding to an acoustic device having the configuration 600 shown in FIG. 6, demonstrating the potential improvements to ANR performance if the signal "$s_1$" can be accurately estimated. Graph 700A plots the undamped response of the transfer function Nso (trace 702) as well as the modally damped response of the transfer function Nso (trace 704). Theoretically, the configuration 600 should yield a damped response of the transfer function Nso, which can be expressed as:

$$\left.\frac{s}{o}\right|_{damped} = Nso + K_{damp}Nso_1\frac{Gsd}{1 - K_{damp}Gsd_1}$$

and should only affect the resonant mode. Just as expected, in graph 700A, a peak of the undamped trace 702 at a resonant frequency (e.g., between 4,000 Hz and 5,000 Hz) was substantially reduced in the damped trace 704 with minimal effects observed at other frequencies. This example demonstrates the ability of an acoustic device having the configuration 600 to specifically target and reduce external noise attributable to a resonant mode of a user's ear canal.

Graph 700B plots the undamped response of the transfer function Gsd (trace 706) as well as the modally damped response of the transfer function Gsd (trace 708). Theoretically, the configuration 600 should yield a damped response of the transfer function Gsd, which can be expressed as:

$$\left.\frac{s}{d}\right|_{damped} = \frac{Gsd}{1 - K_{damp}Gsd_1}$$

and should only affect the resonant mode. Just as expected, in graph 700B, a peak of the undamped trace 706 at a resonant frequency (e.g., between 4,000 Hz and 5,000 Hz) was substantially reduced in the damped trace 708 with minimal effects observed at other frequencies. This example demonstrates the ability of an acoustic device having the configuration 600 to specifically target and reduce unnatural peaks in driver output (e.g., by smoothing the frequency response of the transfer function Gsd) that are attributable to a resonant mode of a user's ear canal.

Figure 8:
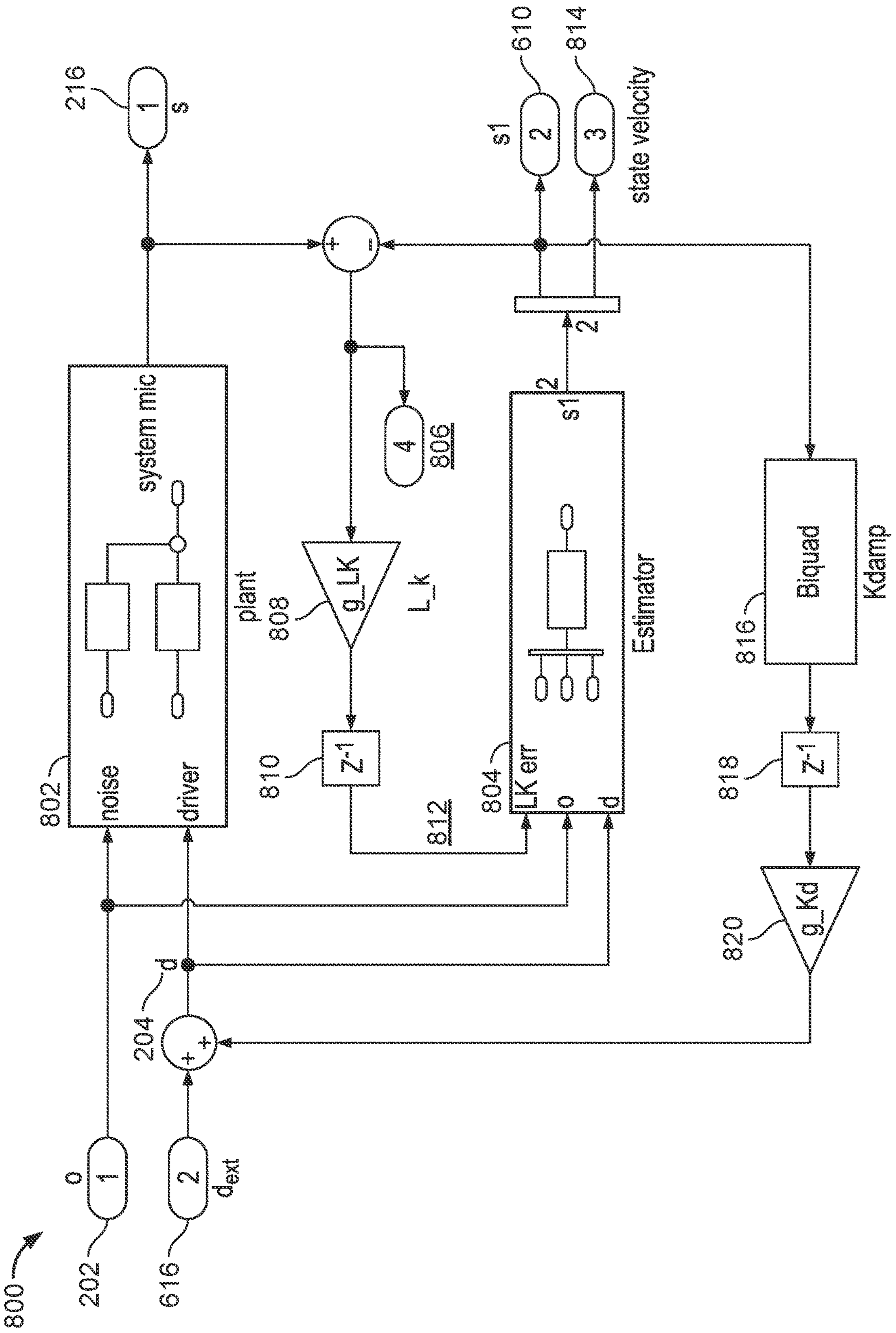
FIG. 8 is a diagram of a Simulink® model representing a fourth example configuration of an acoustic device.

Referring now to FIG. 8, a diagram of a Simulink® model is shown, representing another example configuration 800 of an acoustic device (or a portion thereof). Elements of the configuration 800 that are similar to elements of previously described configurations (e.g., configurations 200, 400, 600) are indicated with similar reference numerals.

Like other configurations of the acoustic device, the configuration 800 includes a plant 802 that receives, as input, the signal "o" 202 and the signal "d" 204. The plant 802 receives the signals 202, 204 and simulates the output signal "s" 216 that is captured at a system microphone of the acoustic device. In some implementations, the plant 802 can correspond to the configuration 200 shown in FIG. 2.

The output signal "s" 216 is fed to a state estimator 804, which receives a signal 812 representative of a difference between the output signal "s" 216 and the estimated resonant response portion of the output signal "s" (e.g., signal "$s_1$" 610). In some implementations, the signal 812 can correspond to a difference 806 between the signal "s" 216 and the signal "$s_1$" 610 after it is scaled by an amplifier 808 and delayed by delay block 810.

The state estimator 804 further receives the signal "o" 202 and the signal "d" 204 as inputs, and estimates, based on the inputs (e.g., signals 202, 204, 812), the resonant response signal (signal "$s_1$" 610) and its modal velocity 814. Just as in configuration 600, in configuration 800, the modal velocity 814 can be fed through a damping loop, with the resulting signal being fed back to the driver (e.g., by being summed with the signal "$d_{ext}$" 616 to generate command signal "d" 204). As shown in FIG. 8, the damping loop can include a damping filter 816 (e.g., a bi-quad filter), a delay block 818, and an amplifier 820. In some implementations, the resonant response signal (signal "$s_1$" 610) can be fed directly to the damping loop (e.g., instead of the modal velocity 814), and the damping filter 816 of the damping loop can be configured to take a derivative of the signal "$s_1$" 610 to obtain the modal velocity.

Figure 9:
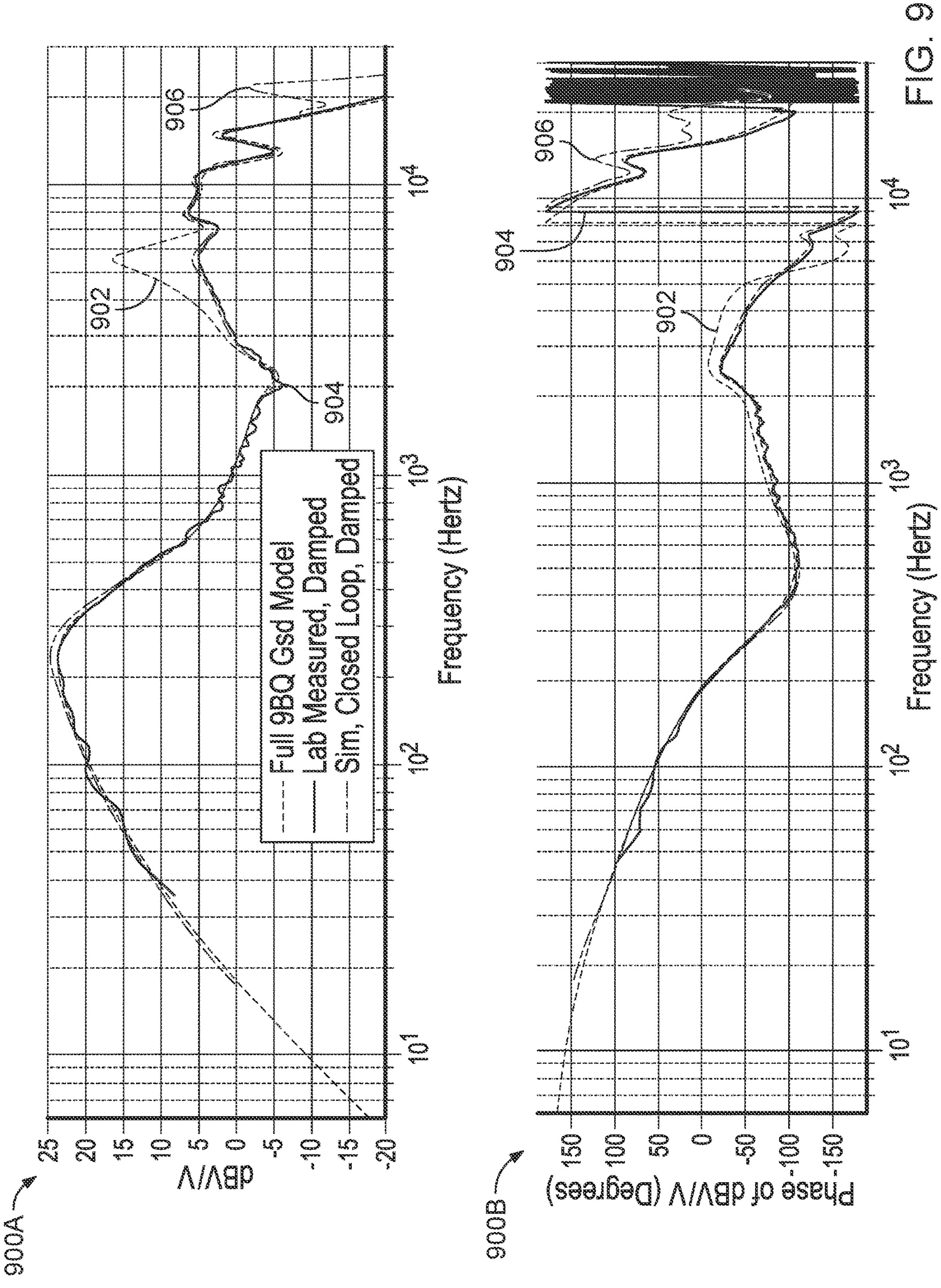
FIG. 9 shows graphs of experimental data corresponding to an acoustic device having the example configuration shown in FIG. 8.

FIG. 9 shows graphs 900A, 900B, which include experimental response data corresponding to an acoustic device having the configuration 800 shown in FIG. 8. Graph 900A plots the magnitude of various acoustic responses at different frequencies, while graph 900B plots the phase of the same acoustic responses. The traces 902 correspond to a response of the full, undamped Gsd transfer function (e.g., the Gsd transfer function 208, which is included in the plant 802 in the configuration 800). The traces 906 correspond to a simulated damped response of the full Gsd model, and the traces 904 correspond to a lab-measured damped response of the full Gsd model.

The traces 902 corresponding to the undamped Gsd transfer function demonstrate a substantial peak attributable a resonant mode of a user's ear canal at a frequency between 5,000 Hz and 6,000 Hz. However, as shown by the traces 904 and 906 (which are very similar to each other), after performing active damping on the resonant mode using modal control, both the simulated damped response and lab-measured response demonstrated a substantial reduction in this peak, effectively smoothing out the response at the resonant frequency.

Figure 10:
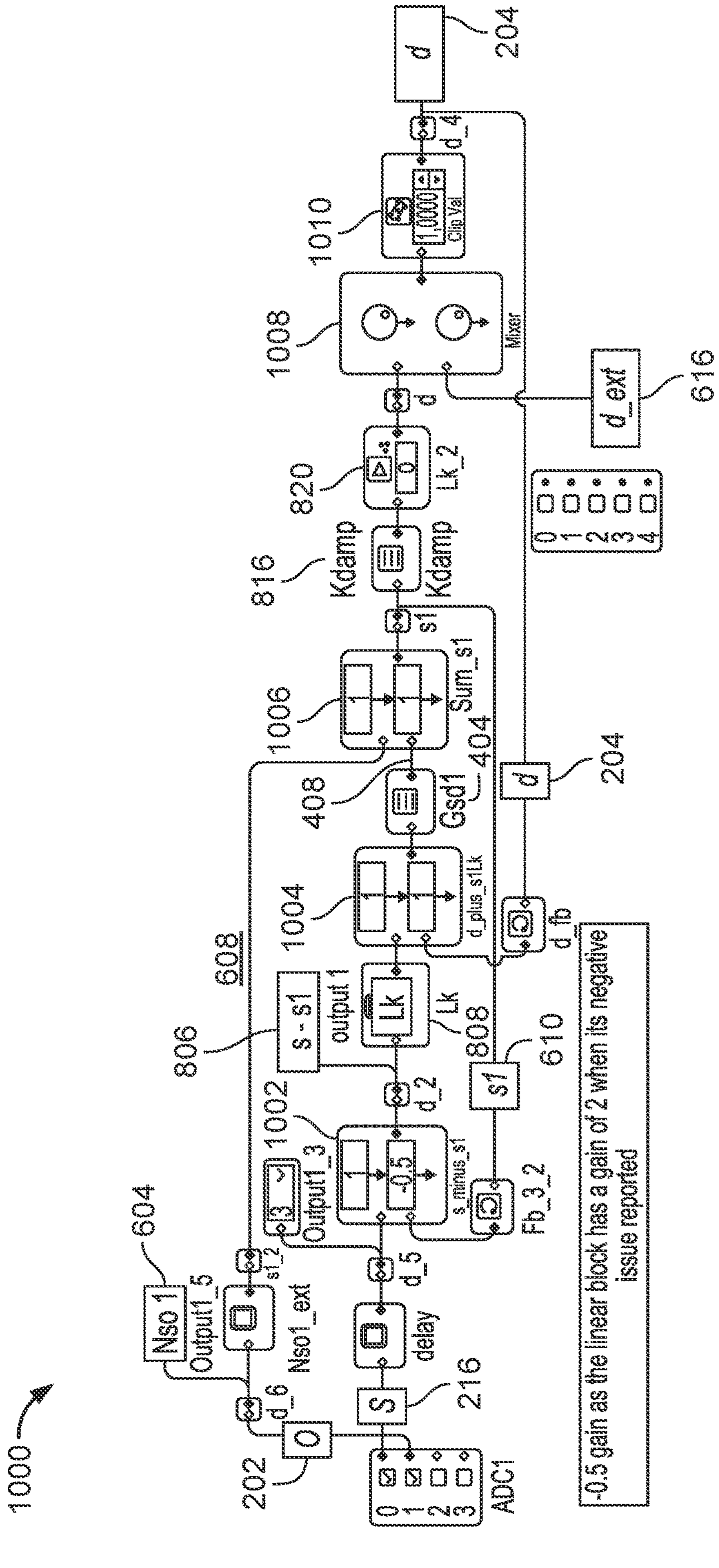
FIG. 10 is a diagram of a hardware implementation of a portion of an acoustic device in accordance with a fifth example configuration of an acoustic device.

Referring now to FIG. 10, a diagram of a hardware implementation of a portion of an acoustic device (e.g., a processor of the acoustic device running software to implement an estimator and a damping controller) is illustrated. The hardware implementation is shown having configuration 1000. Elements of the configuration 1000 that are similar to elements of previously described configurations of acoustic devices (e.g., configurations 200, 400, 600, 800) are indicated with similar reference numerals.

In the configuration 1000, the signal "o" 202 (captured by the outside microphone of the acoustic device) is fed through the $Nso_1$ filter 604 to yield the signal 608 (representing a portion of the external noise captured at the system microphone that is attributable to a resonant mode). Meanwhile, the signal "s" 216 captured at the system microphone is delayed and combined with an estimate of signal "$s_1$" 610 (representing a portion of the total audio captured at the system microphone that is attributable to the resonant mode) at the subtractor 1002. The output of the subtractor 1002 is a difference signal "$s-s_1$" 806, which is amplified by the amplifier 808, combined with the driver command signal "d" 204 at the summer 1004, and fed through the $Gsd_1$ filter 404 to yield the signal 408. As previously described, the signal 408 represents a portion of the driver-outputted audio captured at the system microphone that is attributable to a resonant mode. At summer 1006, the signals 408 and 608 are combined to calculate an updated estimate of the signal "$s_1$" 610. In addition to being fed back to the summer 1002, the signal "$s_1$" 610 is input to the damping filter 816 (which can be configured to obtain the modal velocity of the signal "$s_1$" 610) and scaled by the amplifier 820. The resulting signal is combined with external signal "d_ext" 616 at the mixer 1008, and the combined signal is clipped at the clipping module 1010. The resulting signal is an updated driver command signal "d" 204, which is fed back to the summer 1004.

Figure 11:
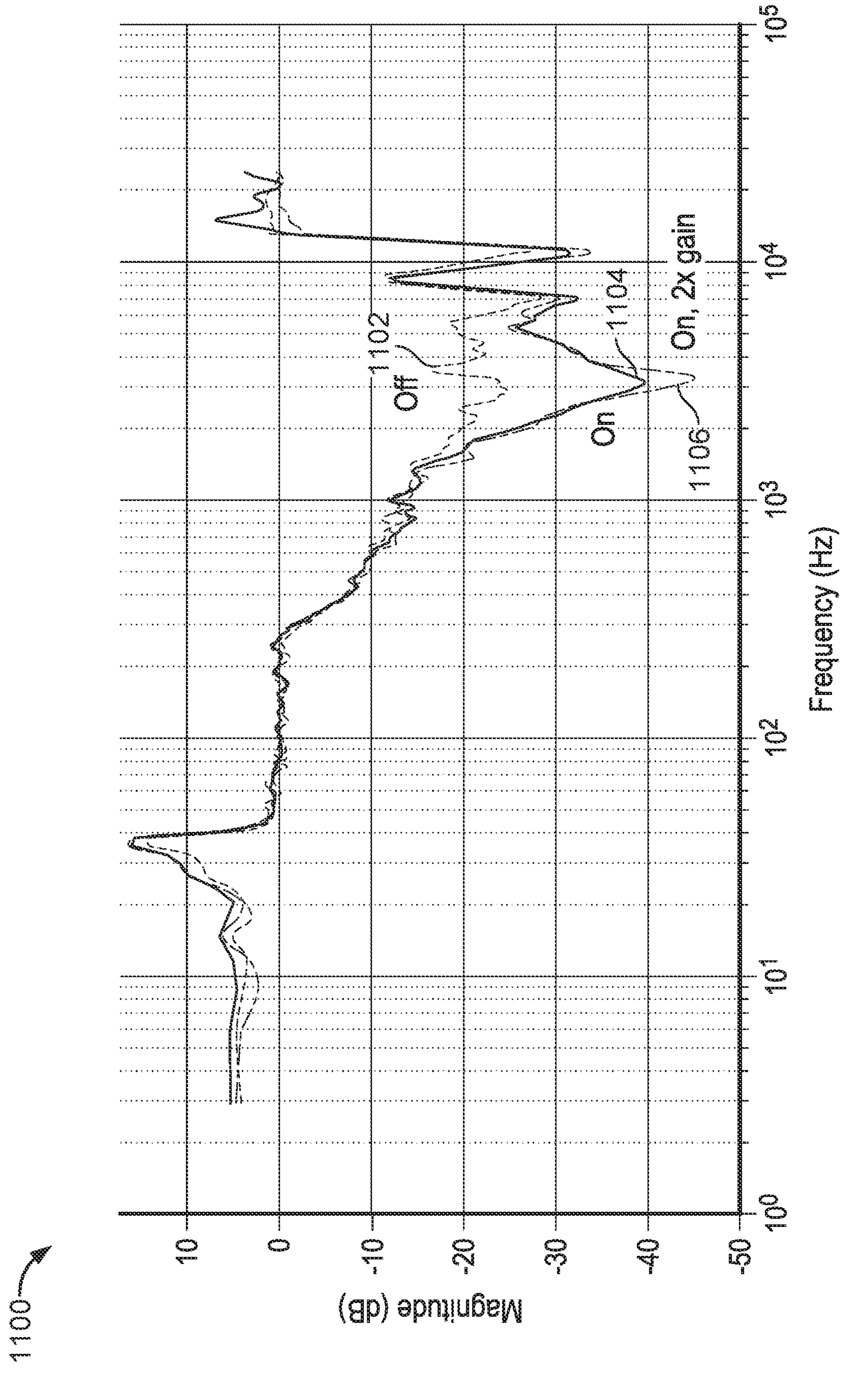
FIG. 11 is a graph of experimental data corresponding to the hardware implementation of the example configuration of the acoustic device shown in FIG. 10.

FIG. 11 is a graph 1100, which includes experimental acoustic response data corresponding to the hardware implementation of an acoustic device including components corresponding to the configuration 1000. The trace 1102 corresponds to a PIG of the acoustic device which exhibits a peak between 3,000 Hz and 4,000 Hz corresponding to a resonant mode of the user's ear canal. The trace 1104 corresponds to an acoustic response of the same device after implementing active damping of the resonant mode according to the configuration 1000. As shown in the graph 1100, the trace 1004 substantially reduces the acoustic response at the resonant frequency. Moreover, the level of reduction is tunable by adjusting the gain of the damping loop (e.g., by adjusting a gain value of the amplifier 820). The trace 1106 shows an acoustic response of the device after doubling the damping loop gain compared to a value that yielded the trace 1004, and as expected, the trace 1106 exhibits an even greater reduction of the acoustic response at the resonant frequency.

Figure 12:
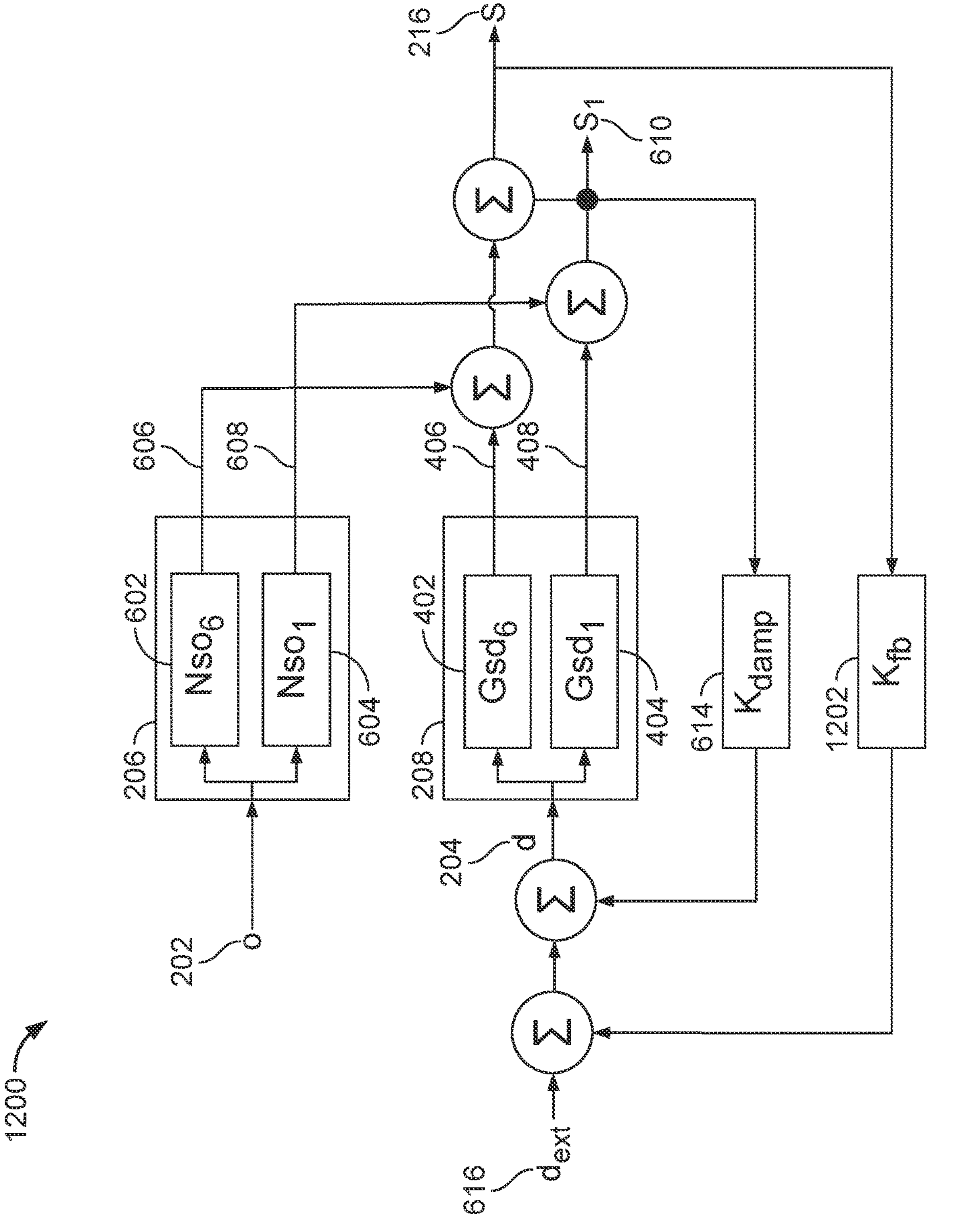
FIG. 12 is a block diagram of a sixth example configuration of an acoustic device.

Referring now to FIG. 12, a block diagram of another example configuration 1200 of an acoustic device (or a portion thereof) is shown. The configuration 1200 is nearly identical to the configuration 600, and accordingly, similar elements are indicated with similar reference numerals. However, the configuration 1200 differs from the configuration 600 since it includes an additional feedback loop in which the signal "s" 216 captured at the system microphone is fed through a feedback filter 1202, and the resulting signal is summed with the driver signal "d" 204. While some of the configurations previously described in this document (e.g., the configurations 600, 800, 1000) only included a single damping loop to implement modal control of a particular resonant mode, the configuration 1200 demonstrates that the modal control technology described herein can readily be combined with other ANR solutions (e.g., broadband control based on feedback and feedforward signals) in a single acoustic device.

Figure 13:
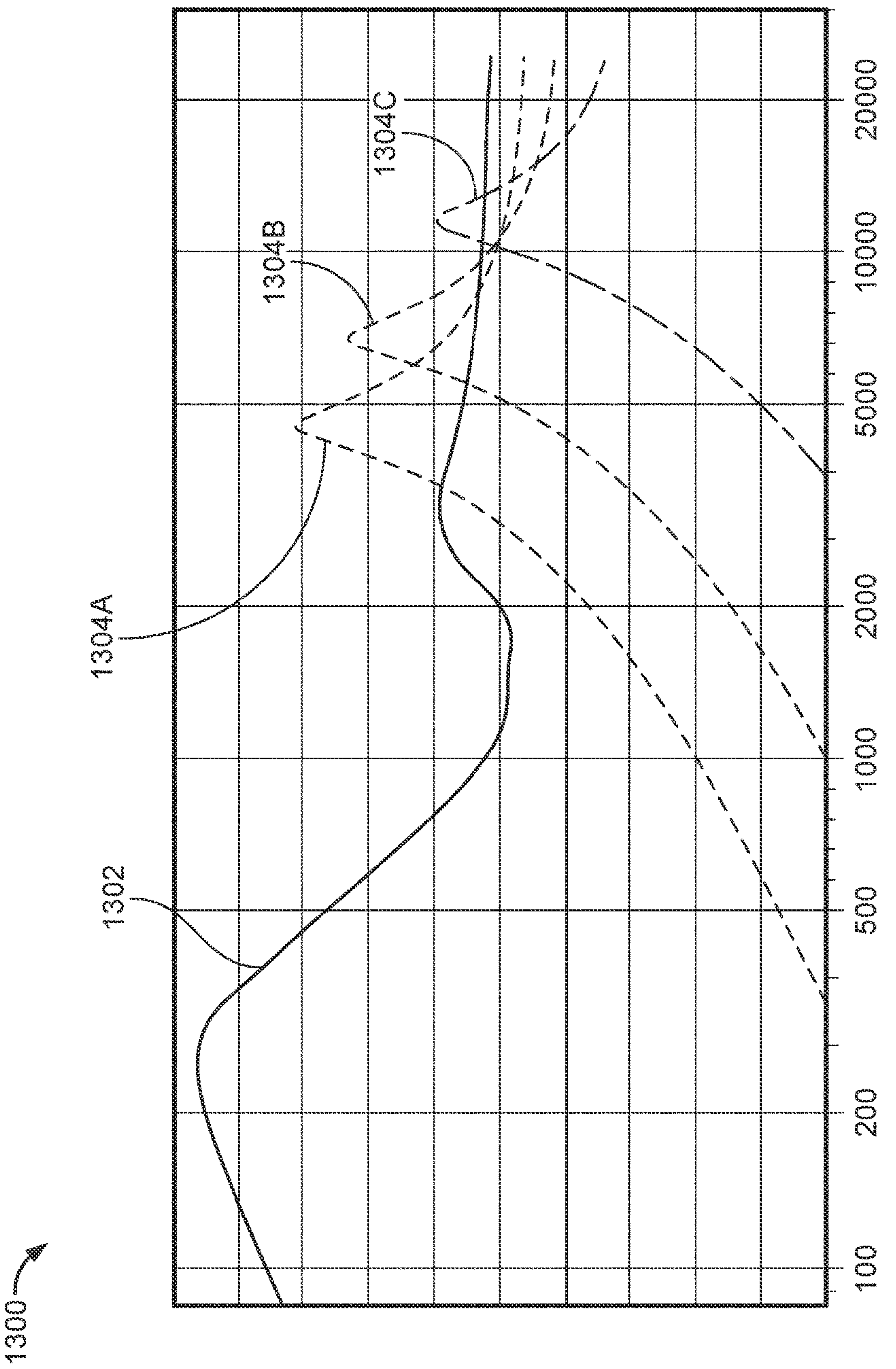
FIG. 13 is a graph illustrating the modelling of multiple acoustic resonant modes in an acoustic response.

In some implementations, the technology described herein can further be extended to include modal control (e.g., using damping feedback loops) of multiple resonant modes simultaneously. FIG. 13 shows a graph 1300, demonstrating that model-fitting approaches can successfully break out a full undamped transfer function Gsd (e.g., the Gsd transfer function 208) into a broadband response 1302 and three separate resonant responses 1304A-1304C. This can be understood as an extension of the modelling approach of the single resonant mode demonstrated in graph 500A of FIG. 5. Thus, a person skilled in the art will appreciate that the present disclosure enables various other configurations for acoustic devices that implement modal control to reduce the acoustic response corresponding to multiple resonant modes.

While the damping loops described above have been described as feedback loops, in some implementations, the feedback damping loops described herein can equivalently be implemented as a combination of a feedback filter and a feedforward filter. For example, referring again to FIG. 10, the equivalent feedback and feedforward filters can respectively have the following transfer functions:

$$K_{FB,eff} = \frac{K_{FB}(1 + G_{SD1}L_K) + K_d G_{SD1} L_K}{1 + G_{SD1}(L_K - K_d)}$$

$$K_{FF\_eff} = \frac{K_{FF}(1 + G_{SD1}L_K) + K_d N_{SO1}}{1 + G_{SD1}(L_K - K_d)}$$

if it is assumed that broadband feedback and feedforward control are implemented by defining the signal "$d_{ext}$" 1010 as follows:

$$d_{ext} = K_{fb}s + K_{ff}o$$

In some implementations, using these equivalent feedback and feedforward filters can have the advantage of easier integration with existing ANR solutions implemented on acoustic devices.

Figure 14:
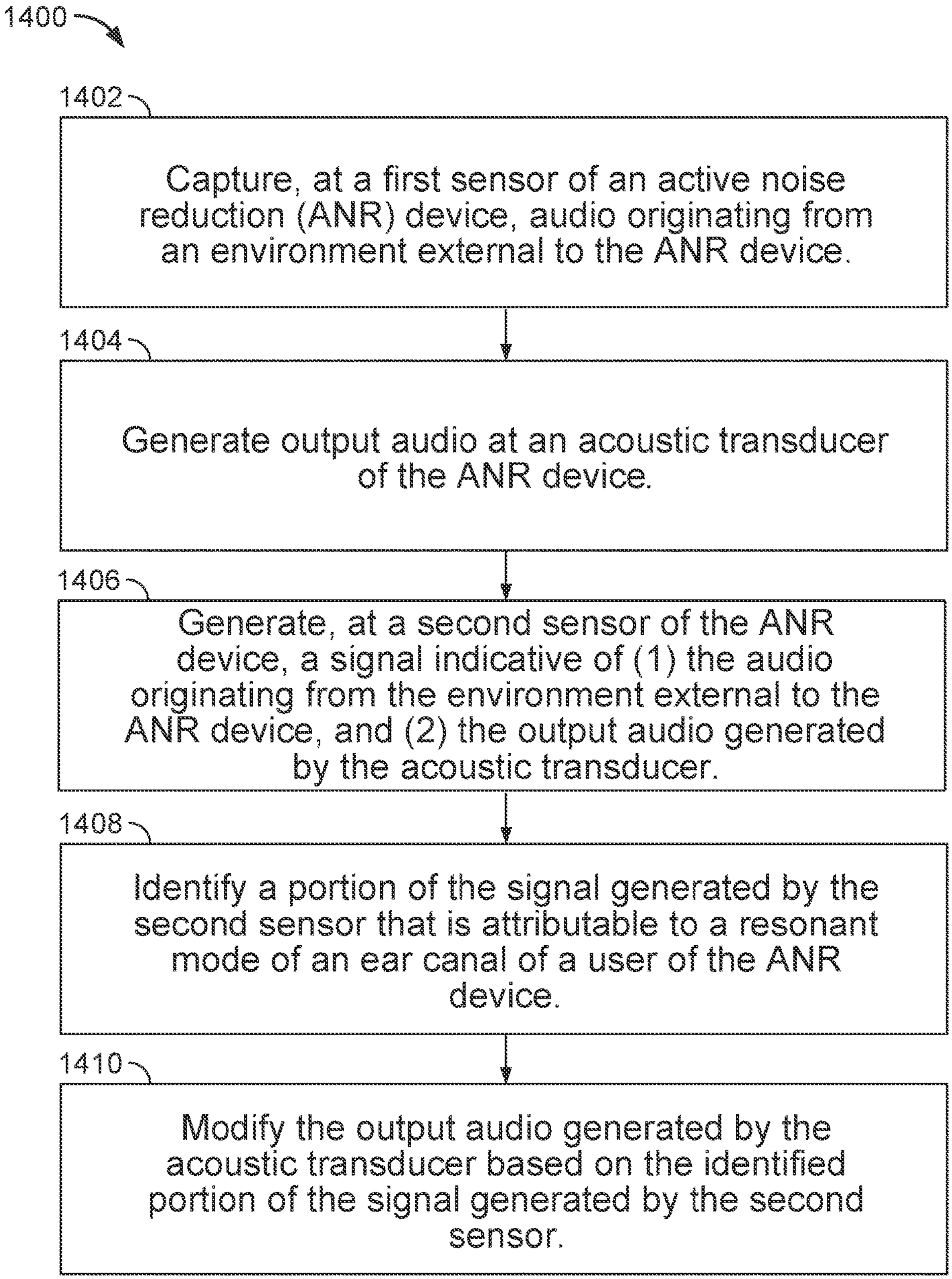
FIG. 14 is a flowchart of a process for actively damping audio attributable to a resonant mode of a user's ear canal.

FIG. 14 illustrates an example process 1400 for actively damping audio attributable to a resonant mode of a user's ear canal. In some implementations, operations of the process 1400 can be executed by an acoustic device such as the in-ear ANR device 100 shown in FIG. 1.

Operations of the process 1400 include capturing, at a first sensor of an active noise reduction (ANR) device, audio originating from an environment external to the ANR device. In some implementations, the first sensor can correspond to the outside microphone of the ANR device (e.g., the outside microphone 102). The audio originating from the environment external to the ANR device can correspond to signal "o" 202.

Operations of the process 1400 also include generating output audio at an acoustic transducer of the ANR device. The acoustic transducer can correspond to the output transducer 106 shown in FIG. 1 or can be another speaker or driver of the acoustic device as described throughout the present disclosure. The generated output audio can correspond to the signal "d" 204.

Operations of the process 1400 also include generating, at a second sensor of the ANR device, a signal indicative of (1) the audio originating from the environment external to the ANR device, and (2) the output audio generated by the acoustic transducer. In some implementations, the second sensor can correspond to a system microphone of the acoustic device (e.g., the system microphone 104) and the generated signal can correspond to audio captured by the system microphone (e.g., signal "s" 216).

Operations of the process 1400 also include identifying a portion of the signal generated by the second sensor that is attributable to a resonant mode of an ear canal of a user of the ANR device. For example, the portion of the signal generated by the second sensor that is attributable to the resonant mode can correspond to the signal "$s_1$" 610 described above. Identifying the portion of the signal generated by the second sensor can include deriving, from the audio originating from the environment external to the ANR device, a first sub-portion (e.g., the signal 608) that is attributable to the resonant mode of the ear canal of the user. Identifying the portion of the signal generated by the second sensor can further include deriving, from the output audio generated by the acoustic transducer, a second sub-portion (e.g., the signal 408) that is attributable to the resonant mode of the ear canal of the user. Identifying the portion of the signal generated by the second sensor can further include combining the first sub-portion and the second sub-portion (e.g., by summing them).

Operations of the process 1400 also include modifying the output audio generated by the acoustic transducer based on the identified portion of the signal generated by the second sensor. Modifying the output audio can include modifying the output audio at a frequency between 3 kHz and 10 kHz. For example, the frequency can correspond to the resonant mode of the user's ear canal. Modifying the output audio can also include generating a signal indicative of a velocity of the resonant mode and summing this signal with the output audio. Generating the signal indicative of the velocity of the resonant mode can include multiplying the velocity of the resonant mode by a constant. Generating the signal indicative of the velocity of the resonant mode can also include filtering (e.g., using the filter 816) the portion of the signal generated by the second sensor (e.g., the signal "$s_1$" 610). In some implementations, modifying the output audio can include modifying the output audio to smooth, at a resonant frequency corresponding to the resonant mode, a transfer function representing a user's ear canal.

Additional operations of the process 1400 can include the following. In some implementations, the process 1400 can include identifying a second portion of the signal generated by the second sensor that is attributable to a second resonant mode of the ear canal of the user. In such implementations, the process 1400 can further include modifying the output audio generated by the acoustic transducer based on this identified second portion. In some implementations, the process 1400 can include modifying the output audio generated by the acoustic transducer using broadband noise reduction at a plurality of frequencies below 2 kHz.

Figure 15:
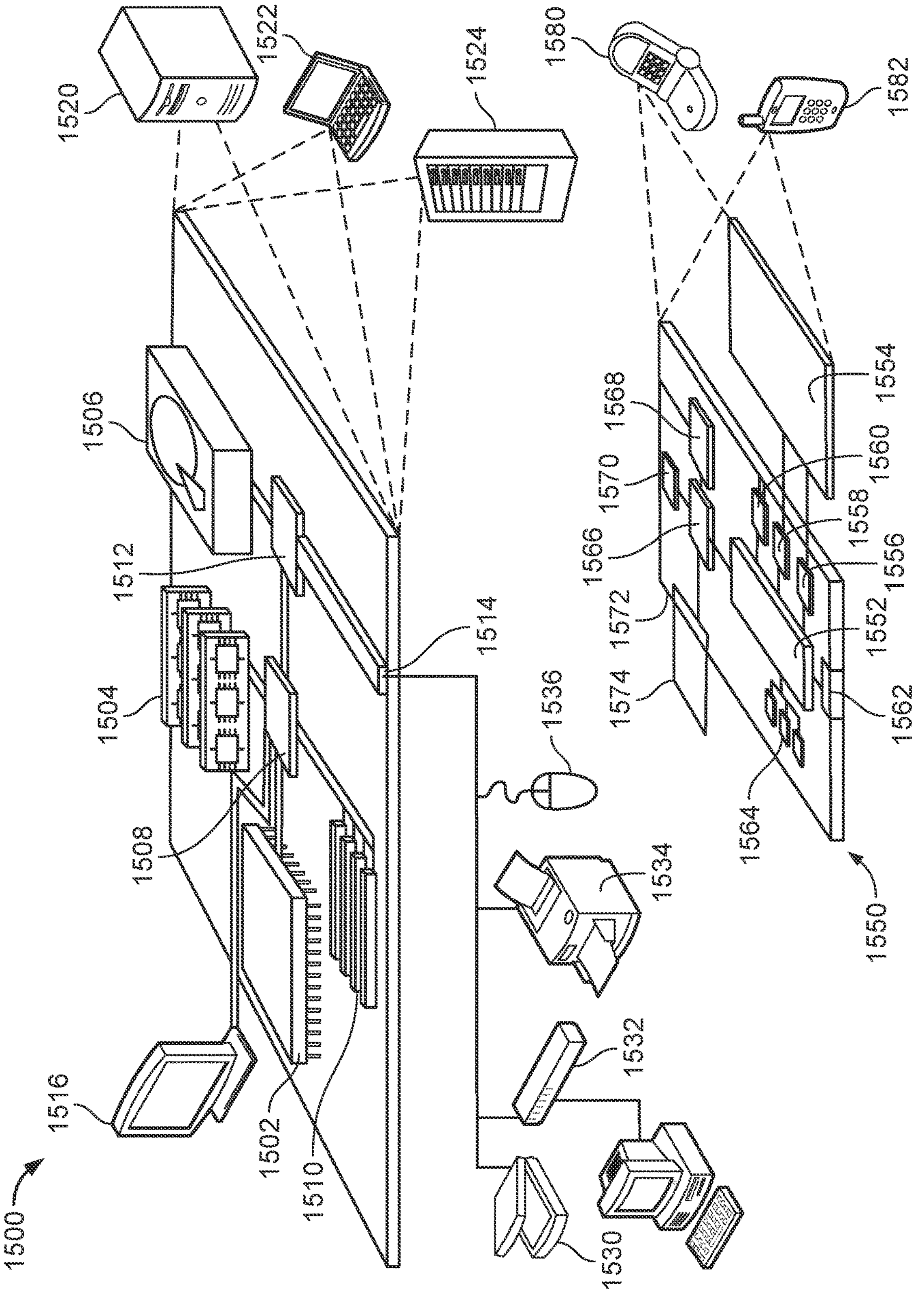
FIG. 15 is a diagram illustrating an example of a computing environment.

FIG. 15 shows an example of a computing device 1500 and a mobile computing device 1550 that are employed to execute implementations of the present disclosure. The computing device 1500 is intended to represent various forms of digital computers, such as laptops, desktops, workstations, personal digital assistants, servers, blade servers, mainframes, and other appropriate computers. The mobile computing device 1550 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting. The computing device 1500 and/or the mobile computing device 1550 can form at least a portion of an acoustic device such as the in-ear ANR device 100 described above.

The computing device 1500 includes a processor 1502, a memory 1504, a storage device 1506, a high-speed interface 1508, and a low-speed interface 1512. In some implementations, the high-speed interface 1508 connects to the memory 1504 and multiple high-speed expansion ports 1510. In some implementations, the low-speed interface 1512 connects to a low-speed expansion port 1514 and the storage device 1504. Each of the processor 1502, the memory 1504, the storage device 1506, the high-speed interface 1508, the high-speed expansion ports 1510, and the low-speed interface 1512, are interconnected using various buses, and may be mounted on a common motherboard or in other manners as appropriate. The processor 1502 can process instructions for execution within the computing device 1500, including instructions stored in the memory 1504 and/or on the storage device 1506 to display graphical information for a graphical user interface (GUI) on an external input/output device, such as a display 1516 coupled to the high-speed interface 1508. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 1504 stores information within the computing device 1500. In some implementations, the memory 1504 is a volatile memory unit or units. In some implementations, the memory 1504 is a non-volatile memory unit or units. The memory 1504 may also be another form of a computer-readable medium, such as a magnetic or optical disk.

The storage device 1506 is capable of providing mass storage for the computing device 1500. In some implementations, the storage device 1506 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 1502, perform one or more methods, such as those described above. The instructions can also be stored by one or more storage devices, such as computer-readable or machine-readable mediums, such as the memory 1504, the storage device 1506, or memory on the processor 1502.

The high-speed interface 1508 manages bandwidth-intensive operations for the computing device 1500, while the low-speed interface 1512 manages lower bandwidth-intensive operations. Such allocation of functions is an example only. In some implementations, the high-speed interface 1508 is coupled to the memory 1504, the display 1516 (e.g., through a graphics processor or accelerator), and to the high-speed expansion ports 1510, which may accept various expansion cards. In the implementation, the low-speed interface 1512 is coupled to the storage device 1506 and the low-speed expansion port 1514. The low-speed expansion port 1514, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 1514 through a network adapter. Such network input/output devices may include, for example, a switch or router.

The computing device 1500 may be implemented in a number of different forms, as shown in FIG. 15. For example, it may be implemented as a standard server 1520, or multiple times in a group of such servers. In addition, it may be implemented in a personal computer such as a laptop computer 1522. It may also be implemented as part of a rack server system 1524. Alternatively, components from the computing device 1500 may be combined with other components in a mobile device, such as a mobile computing device 1550. Each of such devices may contain one or more of the computing device 1500 and the mobile computing device 1550, and an entire system may be made up of multiple computing devices communicating with each other.

The mobile computing device 1550 includes a processor 1552; a memory 1564; an input/output device, such as a display 1554; a communication interface 1566; and a transceiver 1568; among other components. The mobile computing device 1550 may also be provided with a storage device, such as a micro-drive or other device, to provide additional storage. Each of the processor 1552, the memory 1564, the display 1554, the communication interface 1566, and the transceiver 1568, are interconnected using various buses, and several of the components may be mounted on a common motherboard or in other manners as appropriate. In some implementations, the mobile computing device 1550 may include a camera device(s).

The processor 1552 can execute instructions within the mobile computing device 1550, including instructions stored in the memory 1564. The processor 1552 may be implemented as a chipset of chips that include separate and multiple analog and digital processors. For example, the processor 1552 may be a Complex Instruction Set Computers (CISC) processor, a Reduced Instruction Set Computer (RISC) processor, or a Minimal Instruction Set Computer (MISC) processor. The processor 1552 may provide, for example, for coordination of the other components of the mobile computing device 1550, such as control of user interfaces (UIs), applications run by the mobile computing device 1550, and/or wireless communication by the mobile computing device 1550.

The processor 1552 may communicate with a user through a control interface 1558 and a display interface 1556 coupled to the display 1554. The display 1554 may be, for example, a Thin-Film-Transistor Liquid Crystal Display (TFT) display, an Organic Light Emitting Diode (OLED) display, or other appropriate display technology. The display interface 1556 may include appropriate circuitry for driving the display 1554 to present graphical and other information to a user. The control interface 1558 may receive commands from a user and convert them for submission to the processor 1552. In addition, an external interface 1562 may provide communication with the processor 1552, so as to enable near area communication of the mobile computing device 1550 with other devices. The external interface 1562 may provide, for example, for wired communication in some implementations, or for wireless communication in other implementations, and multiple interfaces may also be used.

The memory 1564 stores information within the mobile computing device 1550. The memory 1564 can be implemented as one or more of a computer-readable medium or media, a volatile memory unit or units, or a non-volatile memory unit or units. An expansion memory 1574 may also be provided and connected to the mobile computing device 1550 through an expansion interface 1572, which may include, for example, a Single in Line Memory Module (SIMM) card interface. The expansion memory 1574 may provide extra storage space for the mobile computing device 1550, or may also store applications or other information for the mobile computing device 1550. Specifically, the expansion memory 1574 may include instructions to carry out or supplement the processes described above, and may include secure information also. Thus, for example, the expansion memory 1574 may be provided as a security module for the mobile computing device 1550, and may be programmed with instructions that permit secure use of the mobile computing device 1550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 1552, perform one or more methods, such as those described above. The instructions can also be stored by one or more storage devices, such as one or more computer-readable or machine-readable mediums, such as the memory 1564, the expansion memory 1574, or memory on the processor 1552. In some implementations, the instructions can be received in a propagated signal, such as, over the transceiver 1568 or the external interface 1562.

The mobile computing device 1550 may communicate wirelessly through the communication interface 1566, which may include digital signal processing circuitry where necessary. The communication interface 1566 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 1568 using a radio frequency. In addition, short-range communication, such as using a Bluetooth or Wi-Fi, may occur. In addition, a Global Positioning System (GPS) receiver module 1570 may provide additional navigation- and location-related wireless data to the mobile computing device 1550, which may be used as appropriate by applications running on the mobile computing device 1550.

The mobile computing device 1550 may also communicate audibly using an audio codec 1560, which may receive spoken information from a user and convert it to usable digital information. The audio codec 1560 may likewise generate audible sound for a user, such as through a speaker, e.g., in a handset of the mobile computing device 1550. Such sound may include sound from voice telephone calls, may include recorded sound (e.g., voice messages, music files, etc.) and may also include sound generated by applications operating on the mobile computing device 1550.

The mobile computing device 1550 may be implemented in a number of different forms, as shown in FIG. 15. For example, it may be implemented a phone device 1580, a personal digital assistant 1582, and a tablet device (not shown). The mobile computing device 1550 may also be implemented as a component of a smart-phone, AR device, or other similar mobile device.

The computing device 1500 may be implemented as part of an acoustic device such as the in-ear ANR device described above with respect to FIG. 1.

Computing device 1500 and/or 1550 can also include USB flash drives. The USB flash drives may store operating systems and other applications. The USB flash drives can include input/output components, such as a wireless transmitter or USB connector that may be inserted into a USB port of another computing device.

Other embodiments and applications not specifically described herein are also within the scope of the following claims. Elements of different implementations described herein may be combined to form other embodiments.

What is claimed is:

1. An active noise reduction (ANR) device comprising:

an acoustic transducer configured to generate output audio;

a first sensor configured to capture audio originating from an external environment of the ANR device; and a second sensor configured to generate a signal indicative of:

(1) the audio originating from the external environment, and (2) the output audio generated by the acoustic transducer, wherein the second sensor is disposed closer to a user's ear canal than the first sensor is, and wherein the output audio generated by the acoustic transducer is modified based on a portion of the signal generated by the second sensor, the portion being attributable to a resonant mode of the user's ear canal, wherein the output audio is modified by summing, with the output audio, a signal indicative of a velocity of the resonant mode.

2. The ANR device of claim 1, wherein the portion of the signal generated by the second sensor that is attributable to the resonant mode comprises:

a first sub-portion derived from the audio originating from the external environment of the ANR device, and a second sub-portion derived from the output audio generated by the acoustic transducer.

3. The ANR device of claim 1, wherein the resonant mode corresponds to a resonant frequency between 3 kHz and 10 kHz.

4. The ANR device of claim 1, wherein the output audio is modified by rate feedback on the portion of the signal generated by the second sensor that is attributable to the resonant mode.

5. The ANR device of claim 1, wherein the signal indicative of the velocity of the resonant mode represents a multiple of the velocity of the resonant mode.

6. The ANR device of claim 1, wherein the signal indicative of the velocity of the resonant mode represents a filtered version of the signal generated by the second sensor.

7. The ANR device of claim 1, wherein the ANR device is configured to be inserted, at least partially, in an ear of the user.

8. The ANR device of claim 1, wherein the output audio generated by the acoustic transducer is modified to attenuate, at a resonant frequency corresponding to the resonant mode, the audio originating from the external environment of the ANR device that arrives at the user's ear canal.

9. The ANR device of claim 1, wherein the output audio generated by the acoustic transducer is modified to smooth, at a resonant frequency corresponding to the resonant mode, a transfer function representing the user's ear canal.

10. The ANR device of claim 1, wherein the output audio generated by the acoustic transducer is further modified based on a second portion of the signal generated by the second sensor, the second portion being attributable to a second resonant mode.

11. The ANR device of claim 1, wherein the output audio generated by the acoustic transducer is further modified using broadband noise reduction at a plurality of frequencies below 2 kHz.

12. The ANR device of claim 1, wherein the portion being attributable to the resonant mode of a user's ear canal is identified by accounting for an individualized ear canal response of the user.

13. The ANR device of claim 1, wherein one or more resonant frequencies corresponding to the resonant mode are identified using a phase-locked loop and/or using a peak detection algorithm.

14. The ANR device of claim 1, wherein one or more resonant frequencies corresponding to the resonant mode are tracked in real time.

15. A method comprising:

capturing, at a first sensor of an active noise reduction (ANR) device, audio originating from an environment external to the ANR device;

generating output audio at an acoustic transducer of the ANR device;

generating, at a second sensor of the ANR device, a signal indicative of:

(1) the audio originating from the environment external to the ANR device, and (2) the output audio generated by the acoustic transducer;

identifying a portion of the signal generated by the second sensor that is attributable to a resonant mode of an ear canal of a user of the ANR device, wherein the second sensor is disposed closer to a user's ear canal than the first sensor is; and modifying the output audio generated by the acoustic transducer based on the identified portion of the signal generated by the second sensor, the identified portion being attributable to a resonant mode of the user's ear canal, wherein modifying the output audio generated by the acoustic transducer comprises:

generating a signal indicative of a velocity of the resonant mode, and summing, with the output audio, the signal indicative of the velocity of the resonant mode.

16. The method of claim 15, wherein identifying the portion of the signal generated by the second sensor comprises:

deriving, from the audio originating from the environment external to the ANR device, a first sub-portion that is attributable to the resonant mode of the ear canal of the user;

deriving, from the output audio generated by the acoustic transducer, a second sub-portion that is attributable to the resonant mode of the ear canal of the user; and combining the first sub-portion and the second sub-portion.

17. The method of claim 15, wherein modifying the output audio generated by the acoustic transducer comprises modifying the output audio at a frequency between 3 kHz and 10 kHz, the frequency corresponding to the resonant mode of the ear canal of the user.

18. The method of claim 15, wherein modifying the output audio generated by the acoustic transducer comprises performing rate feedback on the portion of the signal generated by the second sensor that is attributable to the resonant mode.

19. The method of claim 15, wherein generating the signal indicative of the velocity of the resonant mode comprises multiplying the velocity of the resonant mode by a constant.

20. The method of claim 15, wherein generating the signal indicative of the velocity of the resonant mode comprises filtering the portion of the signal generated by the second sensor.

21. The method of claim 15, wherein modifying the output audio generated by the acoustic transducer comprises modifying the output audio to attenuate, at a resonant frequency corresponding to the resonant mode, the audio originating from the environment external to the ANR device that arrives at the user's ear canal.

22. The method of claim 15, wherein modifying the output audio generated by the acoustic transducer comprises modifying the output audio to smooth, at a resonant frequency corresponding to the resonant mode, a transfer function representing the user's ear canal.

23. The method of claim 15, further comprising:

identifying a second portion of the signal generated by the second sensor that is attributable to a second resonant mode of the ear canal of the user; and modifying the output audio generated by the acoustic transducer based on the identified second portion of the signal generated by the second sensor.

24. The method of claim 15, further comprising modifying the output audio generated by the acoustic transducer using broadband noise reduction at a plurality of frequencies below 2 kHz.

25. The method of claim 15, wherein identifying the portion of the signal generated by the second sensor that is attributable to the resonant mode of the ear canal of the user comprises:

accounting for an individualized ear canal response of the user.

26. The method of claim 15, wherein identifying the portion of the signal generated by the second sensor that is attributable to the resonant mode of the ear canal of the user of the ANR device comprises:

identifying one or more resonant frequencies corresponding to the resonant mode using a phase-locked loop and/or using a peak detection algorithm.

27. The method of claim 26, wherein identifying the portion of the signal generated by the second sensor that is attributable to the resonant mode of the ear canal of the user of the ANR device further comprises:

tracking the one or more resonant frequencies in real time.

28. One or more machine-readable storage devices having encoded thereon computer readable instructions for causing one or more processing devices to perform operations comprising:

capturing, at a first sensor of an active noise reduction (ANR) device, audio originating from an environment external to the ANR device;

generating output audio at an acoustic transducer of the ANR device;

generating, at a second sensor of the ANR device, a signal indicative of:

(1) the audio originating from the environment external to the ANR device, and (2) the output audio generated by the acoustic transducer;

identifying a portion of the signal generated by the second sensor that is attributable to a resonant mode of an ear canal of a user of the ANR device, wherein the second sensor is disposed closer to a user's ear canal than the first sensor is; and modifying the output audio generated by the acoustic transducer based on the identified portion of the signal generated by the second sensor, the identified portion being attributable to a resonant mode of the user's ear canal, wherein modifying the output audio generated by the acoustic transducer comprises:

generating a signal indicative of a velocity of the resonant mode, and summing, with the output audio, the signal indicative of the velocity of the resonant mode.

* * * * *